United States Patent [19]

Yamada

[11] Patent Number: 4,644,046

[45] Date of Patent: Feb. 17, 1987

[54] ULTRATHIN FILM, PROCESS FOR PRODUCTION THEREOF, AND USE THEREOF FOR CONCENTRATING A SPECIFIC GAS FROM A GAS MIXTURE

[75] Inventor: Takeyoshi Yamada, Iwakuni, Japan

[73] Assignee: Teijin Limited, Osaka, Japan

[21] Appl. No.: 746,568

[22] Filed: Jun. 19, 1985

[30] Foreign Application Priority Data

Jun. 20, 1984 [JP] Japan ................................ 59-125046
Sep. 21, 1984 [JP] Japan ................................ 59-196521

[51] Int. Cl.$^4$ ............................................. C08G 77/04
[52] U.S. Cl. ........................................ 528/28; 528/33; 528/38; 428/220; 428/447; 55/68; 55/159
[58] Field of Search ................... 55/68, 159; 428/220, 428/447; 528/38, 28, 33

[56] References Cited

U.S. PATENT DOCUMENTS 4,105,617  8/1978  Clark et al. ........................... 528/38
4,374,237  2/1983  Berger et al. ......................... 528/38
4,493,714  1/1985  Ueda et al. ............................. 55/68

Primary Examiner—Melvyn I. Marquis
Attorney, Agent, or Firm—Wenderoth, Lind & Ponack

[57] ABSTRACT

An ultrathin film composed substantially of a silicon-containing polymer comprising bonded units derived from (A) at least one polyamine selected from the group consisting of silicon-containing polyamines containing in the molecule at least two primary and/or secondary amino groups not directly bonded to the silicon atom, (B) at least one compound selected from the group consisting of polysiloxane-type compounds having at least two acidic hydroxyl groups in the molecule, and (C) at least one polyisocyanate selected from the group consisting of polyisocyanates having at least two isocyanate groups in the molecule.

The ultrathin film on the supporting microporous substrate is useful for production of a gaseous mixture containing a specific gas such as $O_2$ in a higher concentration from a gaseous mixture of at least two gases such as air.

28 Claims, No Drawings

ULTRATHIN FILM, PROCESS FOR PRODUCTION THEREOF, AND USE THEREOF FOR CONCENTRATING A SPECIFIC GAS FROM A GAS MIXTURE

This invention relates to an ultrathin film, a process for production thereof, and the use thereof for obtaining a specific gas such as oxygen in concentrated form from a gaseous mixture such as air.

Devices which make use of combustion energy, such as household heating appliances and automobile engines and boilers are designed and operated on the basis of the fact that oxygen is present in a concentration of about 20% in air. Actually, however, environmental pollution and the like occur owing to incomplete combustion.

If air having an enhanced oxygen concentration can be easily supplied, not only can the environmental pollution and the like owing to incomplete combustion be removed, but also the efficiency of combustion can be increased. Furthermore, oxygen-enriched air is useful for aiding in respiration of patients with diseases of the respiratory systems or of premature babies.

As a method of obtaining air having a high oxygen concentration, selective separation and concentration of oxygen in atmospheric air by means of a polymeric membrane is practical.

The technical difficulty associated with the separation of a specific gas such as oxygen from a gaseous mixture such as air consists in the development of a material capable of permitting permeation of the specific gas with sufficient selectivity at a sufficient permeation speed and, and as a matter of practical concern, in the establishment of a technique for producing a very thin membrane from such a material.

A homopolymer of 4-methylpentene or a mixture of a 4-methylpentene homopolymer and an organopolysiloxane/polycarbonate copolymer has previously been known as a material for a gas separation membrane (see U.S. Pat. Nos. 4,192,842 and 4,132,824). The production of a very thin membrane from such a material, as described in these U.S. Patents, is by a batchwise method which comprises dropping a solution of the polymeric material in a water-immiscible organic solvent onto the surface of water and allowing the solution to spread spontaneously on the water surface. What should be improved in this method is that a single very thin membrane so produced has holes large enough to be unusable for selective separation of a specific gas, and that the method is batchwise and not continuous.

U.S. Pat. No. 4,155,793 proposed a process for continuously producing a thin membrane having little holes by holding on a web support two superimposed very thin membranes formed on a water surface, and achieved the aforesaid improvement.

U.S. Pat. No. 4,406,673 and the corresponding European Pat. No. 31725 proposed a process for producing a very thin membrane having a large area which comprises causing an organic compound capable of reducing the surface tension between water and a polymer solution to be present in a solution of a hydrocarbon-type addition polymer in a water-immiscible organic solvent, and thereby allowing the polymer solution to spread spontaneously on a water surface rapidly to a large area.

These processes are all characteristic in that they form a very thin membrane on the surface of water. However, according to such methods involving the formation of a membrane on a water surface, it is virtually impossible to obtain a single membrane which has so little holes as to be usable for separation of a specific gas from a gaseous mixture, and therefore, unless a plurality of such membranes are stacked, a membrane capable of being used for gas separation cannot be obtained. Stacking of a plurality of membranes has the defect that the permeation distance of a gas to be permeated becomes correspondingly longer, and the permeation speed is correspondingly decreased.

In addition to the aforesaid processes for forming a very thin membrane from an organic solvent solution of a polymer, a process is also known which comprises crosslinking a polymer on a porous support to form a crosslinked polymer membrane on the porous support (see Japanese Laid-Open Patent Publication No. 105,203//1982). This process is for the production of a permselective membrane comprising a crosslinked product of polysiloxane composed mainly of recurring units of the general formulae

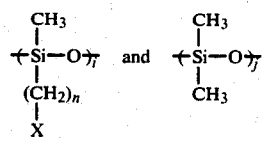

wherein
X represents a residue of an aliphatic or alicyclic compound containing 1 to 4 $NH_2$ or primary or secondary amino groups with the ends of the amino groups being bonded to $-CH_2-_n$, and n is an integer of 1 to 10,
i and j in molar fraction being defined as follows:

$$i+j=1.0,\ 0.1 \leq i \leq 1,\ 0 \leq j \leq 0.9.$$

This patent document discloses (1) a method which comprises coating a uniform solution containing the polysiloxane and a crosslinking agent uniformly in a thin layer on a porous support, and drying it, or (2) a method which comprises coating the polysiloxane alone on a porous support, and crosslinking only its surface. The specification of this Japanese patent document states that the permselective membrane is used as an oxygen-enriching membrane or a reverse osmosis membrane. Example 1 discloses the method (1) mentioned above using a methanol solution of polysiloxane and diethylene glycol diglycidyl ether as a crosslinking agent. Example 2 discloses the method (2) which comprises applying an aqueous solution of polysiloxane having hydroxyl groups on both terminals on a porous support, drying it with hot air at 80° C. for 20 minutes to form a film of the polysiloxane alone on the porous support, then applying an n-hexane solution of isophthaloyl chloride on the polymer film, and drying it with hot air at 120° C. for 10 minutes to crosslink only the surface of the polysiloxane film.

The above Japanese patent document discloses the two methods of producing a crosslinked membrane and also the method of producing polysiloxane having hydroxyl groups at both terminals which is used in the production of the membrane. However, it fails to disclose specifically a process for the production of a very thin membrane composed of silicon-containing polyurea. Investigations of the present inventors have shown that both of the two methods disclosed in the above Japanese Laid-Open Patent Publication cannot produce a very thin membrane of silicon-containing polyurea having excellent selectivity and permeation speeds.

With the foregoing background, the present inventors previously proposed an ultrathin film of silicon-containing polyurea comprising polyaddition bonded units derived from a specific polyamine and a specific isocyanate (see U.S. Pat. No. 4,493,714 and the corresponding European Laid-Open Patent Publication No. 94050).

The U.S. Patent discloses an ultrathin film composed substantially of silicon-containing polyurea comprising polyaddition bonded units derived from (A) at least one polyamine selected from the group consisting of silicon-containing polyamines having in the molecule at least two units of the following formula

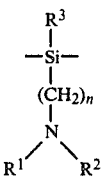

wherein $R^3$ represents a monovalent hydrocarbon group or a fluorocarbon group, $R^1$ and $R^2$ are identical or different and represent a hydrogen atom or a monovalent hydrocarbon group which may have a primary or secondary amino group, or $R^1$ and $R^2$ may be bonded to each other form an alkylene group interrupted by the nitrogen atom forming the secondary amino group, and n is an integer of 1 to 10, provided that $R^1$ and $R^2$ are not simultaneously aliphatic, alicyclic or aromatic groups free from the amino group, not all, but at least one, of the units of formula forming a unit represented by the following formula

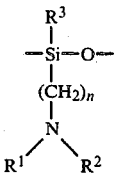

wherein $R^1$, $R^2$, $R^3$ and n are as defined, the free bond from the silicon atom is bonded directly to another carbon atom or another oxygen atom, and the free bond from the oxygen is bonded directly to another silicon atom, and hydrocarbon-type polyamines containing at least two primary or secondary amino groups in the molecule, and (B) at least one polyisocyanate compound selected from the group consisting of silicon-containing polyisocyanates having at least 2 isocyanate groups in the molecular chains and hydrocarbon-type polyisocyanates having at least 2 isocyanate groups in the molecular chains; provided that when the polyisocyanate compound is the hydrocarbon-type polyisocyanate alone, at least one of the selected polyamines is a silicon-containing polyamine containing in the molecule at least one unit of the latter formula in which the free bond from the silicon atom is bonded to a monovalent hydrocarbon group.

Russian Pat. No. 590,962 discloses polyurea formed of a silicon-containing diisocyanate represented by the following formula

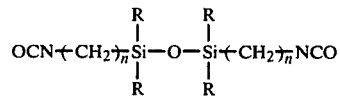

wherein n is 1 or 3, and R is $CH_3$ or $C_6H_5$, and m-xylylenediamine, 4,4'-diaminodicyclohexylmethane, ethylenediamine, N,N'-dimethylethylenediamine or 1,2-propylenediamine. However, the Russian Patent quite fails to describe a very thin film, a process for its production and its use.

It is an object of this invention therefore to provide an ultrathin film having a novel composition.

Another object of this invention is to provide an ultrathin film with excellent selectivity which does not substantially have holes large enough to permit passage of a gaseous mixture directly even when formed in a smaller thickness than the ultrathin film previously proposed by the present inventor in U.S. Pat. No. 4,493,714.

Still another object of this invention is to provide a novel ultrathin film which with respect to a specific gas, has a higher permeation speed than the ultrathin film previously proposed by the present inventors in U.S. Pat. No. 4,493,714.

Yet another object of this invention is to provide a novel ultrathin film which even when formed in a large thickness, can give the same permeation speed as in the case of a thinner conventional ultrathin film depending upon the aforesaid objects and advantages of the present invention.

A further object of this invention is to provide an ultrathin film which can separate a specific gas at a practical permeation speed but because of having a relatively large thickness, posesses good durability.

A still further object of this invention is to provide a process for producing a composite structure of the invention comprising the ultrathin film of the invention supported on a supporting microporous substrate, which comprises forming a silicon-containing polymer on a supporting microporous substrate from the corresponding polyamine, polyol and polyisocyanate.

Other objects and advantages of this invention will become apparent from the following description.

According to this invention, such objects and advantages of this invention are achieved by an ultrathin film composed substantially of a silicon-containing polymer comprising bonded units derived from (A) at least one polyamine selected from the group consisting of silicon-containing polyamines containing in the molecule at least two primary and/or secondary amino groups not directly bonded to the silicon atom, (B) at least one compound selected from the group consisting of polysiloxane-type compounds having at least two acidic hydroxyl groups in the molecule, and (C) at least one polyisocyanate selected from the group consisting of polyisocyanates having at least two isocyanate groups in the molecule.

The ultrathin film of this invention is composed substantially of a silicon-containing polymer comprising bonded units derived from the silicon-containing polyamine (A), the polysiloxane-type compound (b) and the polyisocyanate (C).

It is believed that the bonded units in the present invention include a urea linkage (—NHCONH—), a urethane linkage (—NHCOO—) and a silyl ether linkage (resulting from deamination or deammoniation reaction between silanol and amine).

The components (A), (B) and (C) will be described.

SILICON-CONTAINING POLYAMINE

The silicon-containing polyamine (to be sometimes referred simply as the polyamine hereinafter) should contain in the molecule at least two primary and/or secondary amino groups not bonded directly to the silicon atom.

Examples of the silicon-containing polyamine include a first group of compounds represented by the following formula (I)

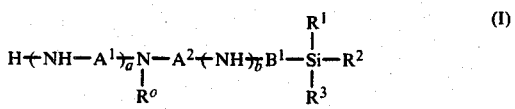

wherein $R^1$, and $R^2$ and $R^3$, independently from each other, represent a hydrocarbon group having 1 to 16 carbon atoms, a fluorinated hydrocarbon group having 1 to 16 carbon atoms, or a group of the following formula (I)-1

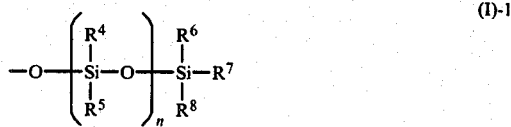

in which $R^4$, $R^5$, $R^6$, $R^7$ and $R^8$, independently from each other, represent a hydrocarbon group having 1 to 16 carbon atoms or a fluorinated hydrocarbon group having 1 to 16 carbon atoms, and n is zero or a number of at least 1, $A^1$ and $A^2$, independently from each other, represent a divalent hydrocarbon group having 2 to 16 carbon atoms which may be interrupted by —O— or —SO$_2$—, $B^1$ represents a divalent hydrocarbon group having 2 to 16 carbon atoms, a is zero or 1, b is zero or 1, and $R°$ represents a hydrogen atom, an alkyl group having 1 to 6 carbon atoms, or a group of the following formula

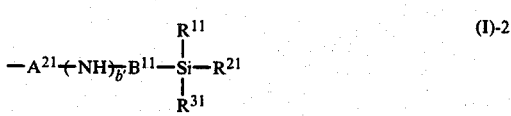

in which $A^{21}$ is a group selected from the definition of $A^2$, $B^{11}$ is a group selected from the definition of $B^1$, $R^{11}$, $R^{21}$ and $R^{31}$, independently from each other, are a group selected from the definition of $R^1$, and b' is a number selected from the definition of b, or $R°$ may be bonded to the group $A^2$ to form a 5- to 7-membered ring together with the nitrogen atom to which they are bonded.

The hydrocarbon group having 1 to 16 carbon atoms in the definitions of $R^1$, $R^2$ and $R^3$ in formula (I) includes, for example, alkyl groups, aromatic groups and aralkyl groups each having 1 to 16 carbon atoms. Specific preferred examples of such hydrocarbon groups include linear or branched alkyl groups such as methyl, ethyl, isopropyl, n-propyl, n-butyl, isobutyl, t-butyl, sec-butyl n-pentyl, n-hexyl, n-octyl, n-nonyl, n-decyl, n-undecyl, n-dodecyl, n-tridecyl, n-tetradecyl, n-pentadecyl, and n-hexadecyl; aromatic groups such as phenyl and tolyl; and aralkyl groups such as benzyl.

Preferred as the hydrocarbon group having 1 to 16 carbon atoms are alkyl groups having 1 to 8 carbon atoms, a phenyl group and a benzyl group.

The fluorinated hydrocarbon group having 1 to 16 carbon atoms in the definition of $R^1$, $R^2$ and $R^3$ includes, for example, fluoroalkyl groups, fluorinated aromatic groups and fluoroalkyl groups having 1 to 16 carbon atoms. Specific examples of such fluorinated hydrocarbon groups are partially or completedly fluorinated alkyl groups having 1 to 16 carbon atoms such as perfluoromethyl, perfluoroethyl or 2-trifluoromethylethyl; fluorinated aromatic groups such as fluorophenyl or trifluoromethyl, and fluorinated aralkyl groups such as rifluoromethylbenzyl.

Among these fluorinated hydrocarbon groups having 1 to 16 carbon atoms, perfluoromethyl, perfluoroethyl, 2-trifluoromethylethyl and trifluoromethylphenyl are especially preferred.

The group of formula (I)-1 in the definitions of $R^1$, $R^2$ and $R^3$ is that in which $R^4$, $R^5$, $R^6$, $R^7$ and $R^8$, independently from each other are selected, as abovementioned, from alkyl groups and fluorinated hydrocarbon groups having 1 to 16 carbon atoms. Specific examples of the group of formula (I)-1 are

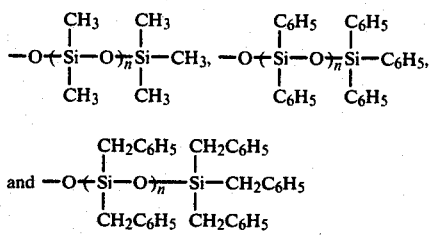

In formula (I)-1, n is zero or a number of at least 1, for example 1 to 250.

In formula (I), $A^1$ and $A^2$, independently from each other, represent a divalent hydrocarbon group having 2 to 16 carbon atoms which may be interrupted by —O— or —SO$_2$—. Examples of the hydrocarbon group having 2 to 16 carbon atoms include alkylene groups having 2 to 12 carbon atoms, cyclohexylene, phenylene, xylylene, methylenephenylene and naphthylene. The alkylene groups having 2 to 12 carbon atoms may be linear or branched.

$A^1$ and $A^2$ may also be groups of the following formula (I)-1-1 which may be interrupted by —O— or —SO$_2$—

wherein $A^{11}$ represents a single bond, —O—, —SO$_2$—,

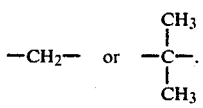 or $B^1$ in formula (I) is a divalent hydrocarbon group having 2 to 16 carbon atoms, such as alkylene groups having 1 to 12 carbon atoms, cyclohexylene, phenylene, xylylene, methylenephenylene or naphthylene. The alkylene groups may be linear or branched.

In formula (I), a is zero or 1, and b is zero or 1.

The alkyl groups having 1 to 6 carbon atoms for $R°$ in formula (I) may be linear or branched, and include, for example, methyl, ethyl, isopropyl, n-propyl, n-butyl, isobutyl, sec-butyl, t-butyl, n-pentyl and n-hexyl.

The definitions of $A^{21}$, $B^{11}$, $R^{11}$, $R^{21}$, $R^{31}$ and b' in formula (I)-2 will be clear from the definitions of $A^2$, $B^1$, $R^{11}$, $R^2$, $R^{31}$ and b in formula (I).

$R°$ maybe bonded to group $A^2$ to form a 5- to 7-membered, preferably 5- or 6-membered ring together with the nitrogen atom to which they are bonded.

The silicon-containing polyamine of formula (I) has a molecular weight of preferably 14 to 800, more preferably 14 to 500, per primary and/or secondary amino group.

Examples of the silicon-containing polyamine of formula (I) are as follows:

 (102).

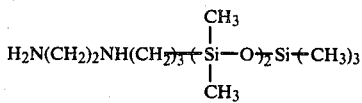 (104).

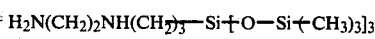 (106).

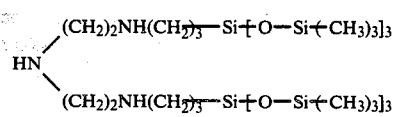 (108).

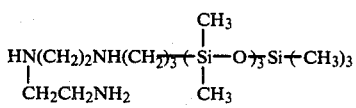 (110).

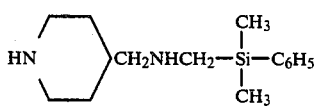 (112).

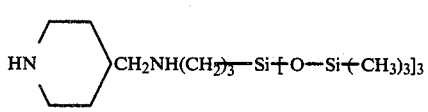 (114).

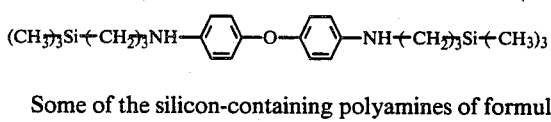 (116).

Some of the silicon-containing polyamines of formula (I) are easily available commercially, and the others may be produced by methods known per se.

Examples of the silicon-containing polyamine further include a second group of compounds containing in the molecule at least one bonded unit represented by the following formula (II)

 (II)

wherein $R^9$ represents a monovalent hydrocarbon group having 1 to 16 carbon atoms or a monovalent fluorinated hydrocarbon group having 1 to 16 carbon atoms, $R^{10}$ and $R^{12}$ are identical or different, and each represents a hydrogen atom, or a monovalent hydrocarbon group having 1 to 16 carbon atoms which may contain a primary or secondary amino group and a silicon atom, or $R^{10}$ and $R^{12}$ may be bonded to each other to form an alkylene group interrupted by the group —NH—, p is an integer of 1 to 10, provided that $R^{10}$ and $R^{12}$ are not simultaneously hydrocarbon groups having no amino group; and at least two primary and/or secondary amino groups in the molecule.

In formula (II), $R^{10}$ and $R^{12}$ are identical or different and each represents a hydrogen atom, or a monovalent hydrocarbon group which may contain a primary or secondary amino group and a silicon atom, or $R^{10}$ and $R^{12}$ may be bonded to each other to form an alkylene group interrupted by the nitrogen atom forming a secondary amino group (—NH—).

The monovalent hydrocarbon may have a primary or secondary amino group as a substituent.

The monovalent hydrocarbon group having 1 to 16 and containing no amino group is preferably an alkyl group, an alicyclic group, an aromatic group or an aralkyl group, especially preferably an alkyl group having 1 to 12 carbon atoms, an alicyclic group having 6 to 15 carbon atoms, an aromatic group having 6 to 15 carbon atoms or an aralkyl group having 7 to 15 carbon atoms.

The alkyl groups having 1 to 12 carbon atoms and containing no amino group may be linear or branched, or may be substituted by an alicyclic group. Examples include such alkyl groups as methyl, ethyl, propyl, butyl, pentyl, hexyl, heptyl, octyl, nonyl, decyl, undecyl and dodecyl, and alkyl groups substituted by alicyclic groups, such as cyclohexylmethyl and cyclohexylethyl.

Examples of the alicyclic group having 6 to 15 carbon atoms and containing no amino group are cyclohexyl groups which may be substituted by an alkyl group, as represented by the following formula

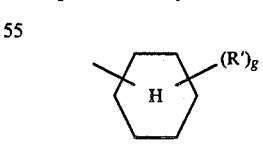

wherein R' represents an alkyl group having 1 to 5 carbon atoms, and g is zero, 1 or 2. Specific examples are cyclohexyl, methylcyclohexyl and dimethylcyclohexyl.

Examples of the aromatic group having 6 to 15 carbon atoms and containing no amino group include a phenyl group which may be substituted by an alkyl group as represented by the formula

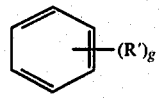

wherein R' and g are as defined above, a naphthyl group which may be substituted by an alkyl group as represented by the formula

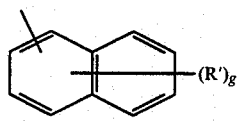

wherein R' and g are as defined above, and a diphenyl group which may be substituted by an alkyl group as represented by the formula

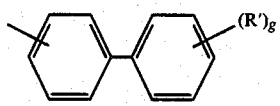

wherein R' and g are as defined above.

Examples of the phenyl group which may be substituted by an alkyl group include phenyl, tolyl, ethylphenyl, dimethylphenyl and cumyl.

Examples of the naphthyl group which may be substituted by an alkyl group include 1-naphthyl, 2-naphthyl, methylnaphthyl and ethylnaphthyl.

Examples of the diphenyl group which may be substituted by an alkyl group include 1-, 2- or 3-diphenyl, and methyldiphenyl.

Examples of the aralkyl group having 7 to 15 carbon atoms and containing no amino group are phenylalkyl groups which may be substituted by an alkyl group as represented by the following formula

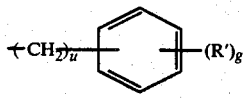

wherein R' and g are as defined above, and u is 1 or 2. Specific examples include benzyl, (methylphenyl)methyl, (ethylphenyl)methyl, alpha-phenethyl and beta-phenethyl.

The carbon chain of the alkyl group containing an amino group may be linear or branched, or it may be substituted by an alicyclic group. Examples include 2-aminoethyl, 3-aminopropyl, 4-aminobutyl, 5-aminopentyl, 6-aminohexyl, 7-aminoheptyl, 8-aminooctyl, 9-aminononyl, 10-aminodecyl, 11-aminoundecyl, 12-aminododecyl, 2-(aminocyclohexyl)ethyl, and 3-aminomethylcyclohexyl-1-ylmethyl.

Examples of the alicyclic group having 6 to 15 carbon atoms containing an amino group are substituted cyclohexyl groups represented by the following formula

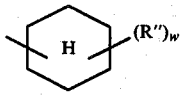

wherein R" represents a hydrogen atom, an amino group, an alkyl group having 1 to 5 carbon atoms or an aminoalkyl group having 1 to 5 carbon atoms, and w is 1 or 2, provided that when w is 1, R" is an amino group or an aminoalkyl group having 1 to 5 carbon atoms, and when w is 2, the two R" groups may be identical or different but one of them is an amino group or an aminoalkyl group having 1 to 5 carbon atoms. Specific examples include 3-aminocyclohexyl, 3-amino-4-methylcyclohexyl, 4-aminomethylcyclohexyl and 4-(3-aminopropyl)cyclohexyl.

Examples of the aromatic group having 6 to 15 carbon atoms having an amino group include substituted phenyl groups represented by the following formula

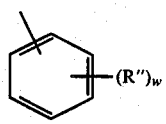

wherein R" and w are as defined above, and substituted naphthyl groups represented by the following formula

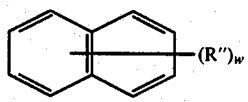

wherein R" and w are as defined above.

Specific examples of the substituted phenyl group are 4-aminophenyl, 3-aminophenyl, 4-aminomethylphenyl, diaminophenyl and the corresponding substituted phenyl groups wherein the amino group is a lower alkylamino group such as methylamino or ethylamino.

Specific examples of the substituted naphthyl group are aminonaphthyl, diaminonaphthyl, 1-amino-2-methylnaphthyl, and the corresponding substituted naphthyl groups wherein the amino group is a lower alkyl amino group such as methylamino or ethylamino.

An example of the substituted tetralin group is aminotetralin.

Examples of the aralkyl group having 7 to 15 carbon atoms and containing an amino group include substituted aralkyl groups of the following formula

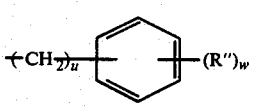

wherein R" and w are as defined above, and u is 1 or 2. Specific examples are (3-aminophenyl)methyl, (4-aminophenyl)methyl, 2-(3-aminophenyl)ethyl, and (4-aminomethylphenyl)methyl.

Examples of the monovalent hydrocarbon group having 1 to 16 carbon atoms which may contain a silicon atom are the aforesaid hydrocarbon groups containing no amino group or the aforesaid hydrocarbon groups containing an amino group, for example alkyl groups having 1 to 12 carbon atoms, alicyclic groups having 6 to 15 carbon atoms, aromatic groups having 6 to 15 carbon atoms or aralkyl group having 7 to 15 carbon atoms which may be substituted by trialkyl silyl groups having 1 to 10 carbon atoms in each alkyl moiety.

Examples of the trialkylsilyl groups having 1 to 10 carbon atoms in each alkyl moiety are trimethylsilyl, triethylsilyl, tri-n-propylsilyl and tri-n-decylsilyl groups. Accordingly, 3-(trimethylsilyl)propyl is an example of the monovalent hydrocarbon group having 1 to 16 carbon atoms which may contain a silicon atom.

$R^{10}$ and $R^{12}$ may be bonded to each other to form an alkylene group interrupted by the nitrogen atom forming a secondary amino group. Examples of such alkylene groups are those represented by the following formula $$-CH_2)_h NH-CH_2)_k$$

wherein h and k are identical or different and represent 1, 2 or 3, provided that the total sum of h and k is 3 to 5, preferably 3 or 4. Specific examples of the alkylene groups are $-CH_2NHCH_2CH_2-$, $-CH_2CH_2NHCH_2CH_2-$, $-CH_2NHCH_2CH_2CH_2-$, and $-CH_2CH_2NHCH_2CH_2CH_2-$.

Preferably, either one of $R^{10}$ and $R^{12}$ is a hydrogen atom.

$R^9$ is a monovalent hydrocarbon group having 1 to 16 carbon atoms or a fluorinated hyrocarbon group having 1 to 16 carbon atoms. Preferred examples of the monovalent hydrocarbon are alklyl groups having 1 to 10 carbon atoms, cycloalkyl groups having 5 or 6 carbon atoms, a phenyl group and a tolyl group. The fluorinated hydrocarbon groups are fluorinated products of the above-exemplified alkyl groups.

Specific examples of the alkyl groups having 1 to 10 carbon atoms and the cyclohexyl groups having 5 or 6 carbon atoms are clearly seen from the examples of the alkyl group and the alicyclic group for $R^{10}$. The fluorinated hydrocarbon group may be mono- or perfluorinated products of the above hydrocarbon groups, for example fluorinated alkyl groups having 1 to 10 carbon atoms such as trifluoromethyl, 2-trifluoromethylethyl, 1-fluoroethyl, 2-fluoropropyl, 2,2-difluoropropyl, 2-fluorobutyl, perfluoropentyl and perfluorohexyl, fluorinated alicyclic groups having 5 or 6 carbon atoms such as fluorocyclohexyl and fluorocyclopentyl, mono- or tetra-fluorophenyl, and trifluoromethylphenyl.

p is an integer of 1 to 10, preferably 2 to 6. Accordingly, $-CH_2-)_p$ represents, for example, methylene, dimethylene, trimethylene, tetramethylene, pentamethylene, hexamethylene or decamethylene.

The second group of silicon-containing polyamines of this invention have at least two primary and/or secondary amino groups not directly bonded to a silicon atom in the molecule.

Preferably, not all, but at least some, of the bonded units of formula (II) in the second group of silicon-containing polyamine form units represented by the following formula (II)-a

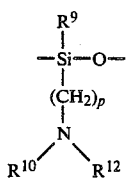

(II)-a wherein $R^9$, $R^{10}$ and $R^{12}$ are the same as defined for formula (II) above.

In formula (II)-a, the free bond from the silicon atom is directly bonded to another carbon atom (not the carbon atoms of R'' and $-CH_2-_p$ constituting the silicon-containing polyamine molecule) or another oxygen atom and the free bond from the oxygen atom in formula (II)-a is directly bonded to another silicon atom (not the indicated silicon atom) constituting the silicon-containing polyamine molecule.

It can be seen that the second group of silicon-containing polyamines of this invention have a siloxane-type molecular skeleton containing at least two units of formula (II) in the molecule and at least one Si—O—Si linkage in the molecule, and contains a primary or secondary amino group represented by the following formula

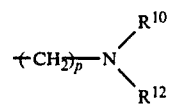

wherein $R^{10}$, $R^{12}$ and p are as defined hereinabove, which is directly bonded to a silicon atom forming the skeleton.

Preferably, the second group of silicon-containing polyamines in this invention have units represented by the following formula (III)

$$\begin{array}{c} R^{13} \\ | \\ -Si-O- \\ | \\ R^{14} \end{array} \qquad (III)$$

wherein $R^{13}$ and $R^{14}$ are identical or different and each represents a monovalent hydrocarbon group, fluorinated hydrocarbon group or tri-hydrocarbon silyl hydrocarbon group having 1 to 16 carbon atoms, in addition to the units of formulae (II) and (II)-a.

Examples of the monovalent hydrocarbon group and the fluorinated hydrocarbon group in the above formula may be the same as those which have already been given for $R^9$.

The tri-hydrocarbon silyl hydrocarbon group is, for example, one in which the tri-hydrocarbon silyl moiety is, for example, an alkyl group having 1 to 16 carbon atoms or a phenyl group, and the hydrocarbon moiety substituted by the aforesaid moiety is a monovalent hydrocarbon group having 1 to 16 carbon atoms and containing no amino group as defined above for $R^{10}$.

A first sub-group of preferred silicon-containing polyamines of the second group are represented by the following formula (IV)

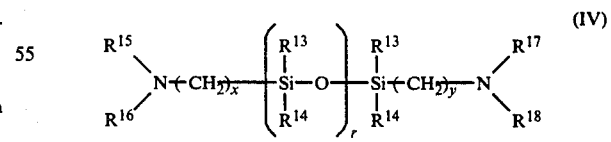

(IV)

wherein $R^{13}$ and $R^{14}$ are identical or different and each represents a monovalent hydrocarbon, fluorinated hydrocarbon or tri-hydrocarbon silyl hydrocarbon group having 1 to 16 carbon atoms, a plurality of $R^{13}$ groups or a plurality of $R^{14}$ groups are identical or different, $R^{15}$, $R^{16}$, $R^{17}$ and $R^{18}$ are identical or different and are selected from the groups defined for $R^{10}$ and $R^{12}$, x and y are identical or different and each represents an integer of 1 to 10, and r represents zero or a number of 1 to 250.

A second sub-group of preferred silicon-containing polyamines of the second group are represented by the formula (V)

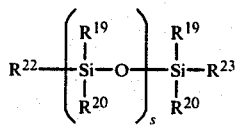 (V)

wherein
R$^{19}$ and R$^{20}$ groups are identical or different and each represents a monovalent hydrocarbon group having 1 to 16 carbon atoms, a fluorinated hydrocarbon group having 1 to 16 carbon atoms, or a group of the following formula (V)-1

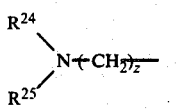 (V)-1 in which R$^{24}$ and R$^{25}$ are identical or different and are selected from the groups defined for R$^{10}$ and R$^{12}$, and z is an integer of 1 to 10,
R$^{22}$ and R$^{23}$ are identical or different and each represents a hydroxyl group, a monovalent hydrocarbon group, a fluorinated hydrocarbon group or a monovalent hydrocarbon—O— group or a group of formula (V)-1 mentioned above and s is a number of 1 to 250, provided that a plurality of the groups of formula (V)-1 are not bonded to the same silicon atom simulaneously, and the compound of formula (V) contains at least 2 primary or secondary amino groups.
The definitions and specific examples of R$^{13}$, R$^{14}$, R$^{15}$, R$^{16}$, R$^{17}$ and R$^{18}$ in formula (IV) will be apparent from those of R$^{13}$, R$^{14}$, R$^{10}$ and R$^{12}$ given hereinabove.

x and y, in accordance with the definition of p in formula (I), are integers of 1 to 10, preferably 2 to 6, and r is a number of 1 to 250, preferably 2 to 200.
It will be understood that the first sub-group compounds of formula (IV) all have a primary or secondary amino group at the end of the molecule.
In formula (V), R$^{19}$ and R$^{20}$ groups are identical or different and each represents a monovalent hydrocarbon group, a fluorinated hydrocarbon group or an amino-containing group of formula (V)-1. Specific examples of these will be clear from the above given specific examples of R$^{13}$, R$^{10}$, R$^{12}$, and p given hereinabove.
R$^{22}$ and R$^{23}$ are identical or different and each represents a hydroxyl group, a monovalent hydrocarbon group, a fluorinated hydrocarbon group or a monovalent hydrocarbon—O group. Specific examples of the monovalent hydrocarbon group and fluorinated hydrocarbon group will be clear from the foregoing description. The monovalent hydrocarbon—O— group is preferably an alkoxy group having 1 to 10 carbon atoms or an aryloxy group having 6 to 15 carbon atoms. Those skilled in the art will be able to understand specific examples of these groups from the examples of the alkyl groups having 1 to 10 and the aromatic groups aving 6 to 15 carbon atoms illustrated hereinabove with respect to R$^{10}$.
s is a number of 1 to 250, preferably 2 to 200.
It will be understood that the second sub-group compounds of formula (V) have at least 2 primary or secondary amino groups as pendant groups of the molecule rather than at the molecular end. The products of formula (V) do not include those in which the amino-containing groups of formula (V)-1 are bonded to the same silicon atom because such compounds are not desired.
Examples of compounds encompassed within the above formula (IV) forming the first sub-group of the second group compounds are given below.

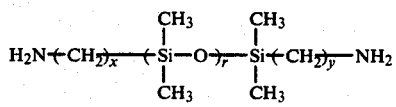 (IV)'

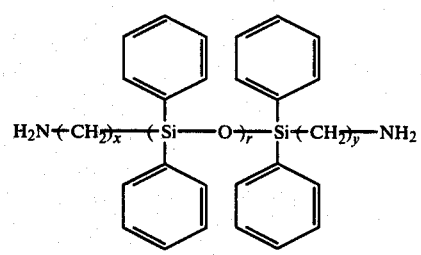 (IV)"

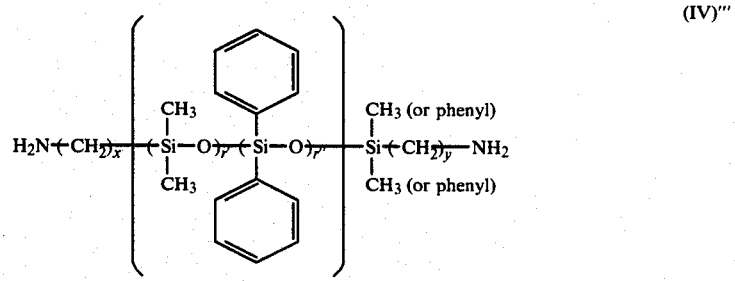 (IV)'''

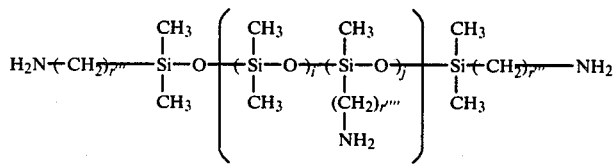

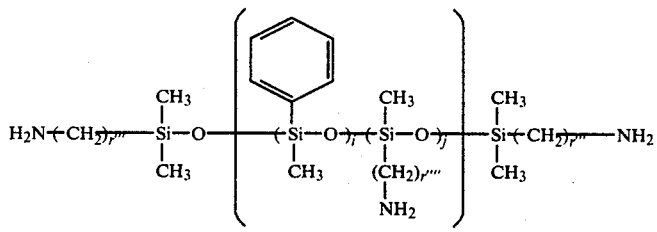

In the above formulae, r' and r" are identical or different, and each represents zero or a number of 1 to 250, provided that the sum of r' and r" is 1 to 250, and when r' is zero, phenyl groups are bonded to the silicon atom at the right end of formula (IV)''', when r" is zero, methyl groups are bonded to the silicon atom at the right end of formula (IV)''', and [ ] shows that the dimethylsiloxy groups and the diphenylsiloxy groups are bonded in an arbitrary sequence. p Examples of compounds encompased within the second sub-group compounds of formula (V) are those represented by the formula

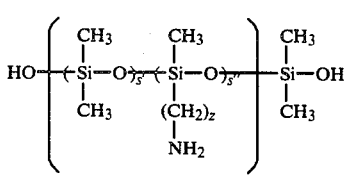

(V)' wherein s' is 0 or a number of 1 to 250, and s" is a number of 2 to 250, provided that the sum of s' and s" is 2 to 250, and [ ] shows that the dimethylsiloxy groups and the (aminoalkyl)(methyl)siloxy groups are bonded in an arbitrary sequence.

The silicon-containing polyamines of the second group represented by formula (IV) can be produced, for example, by producing dimethylmonochlorosilane [(CH₃)₂SiHCl] from monomethyldichlorosilane (CH₃SiHCl₂) by the Grignard reaction, reacting the product with water to form bis(dimethyl silyl)ether of the following formula

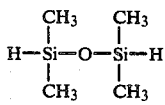

and reacting the product with allylamine (NH₂CH₂CH=CH₂) by hydrosilylation to form a silicon-containing polyamine of the following formula

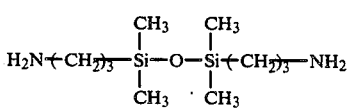
(IV)'-a

The resulting silicon-containing polyamine of formula (IV)'-a corresponds to a compound of formula (IV) in which $R^{15}$, $R^{16}$, $R^{17}$ and $R^{18}$ are hydrogens, x and y are 3, $R^{13}$ and $R^{14}$ are methyl groups, and r is 1. Compounds of formula (IV) in which r is 2 or more can be produced by reacting the silicon-containing polyamine of formula (IV)'-a with cyclic siloxane of the following formula

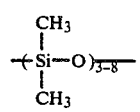

having 3 to 8 dimethylsiloxy groups bonded cyclically.

Thus, compounds of formula (IV) in which x and y are 3 and r is at least 2 can be produced. The resulting products are mixtures of various compounds in which r is at least 2, and can be directly used as the silicon-containing polyamine in the present invention. If desired, compounds of a low degree of polymerization in which r is about 2 to 6 can be obtained in pure form by fractional distillation.

It will be easily understood from the above description of the process for producing the compounds of formula (IV) that compounds included within the formula (IV) can be produced by using the corresponding reagents in the corresponding reaction steps.

A compound of formula (V) in which z is 3, for example, can be easily produced by polycondensing monoaminopropyl monomethyldimethoxysilane and dimethyldimethoxysilane in the presence of water. Compounds of formula (V) in which $R^{22}$ and/or $R^{23}$ is a monovalent hydrocarbon group or a fluorinated hydrocarbon group can be produced by performing the above polycondensation in the presence of the corresponding monoalkoxysilane such as the trimethylmonomethoxysilane or monotrifluoromethyldimethylmonomethoxysilane.

A third group of silicon-containing polyamines used in this invention contain in the molecule at least one bonded unit represented by the following formula (VI)

 (VI)

wherein $R^9$, $R^{10}$ and $R^{12}$ are the same as defined in formula (II), and Ar represents a divalent aromatic hydrocarbon group, and also at least 2 primary and/or secondary amino groups in the molecule.

Formula (VI) corresponds to formula (II) in which —$CH_2$—$_p$ is replaced by Ar. Examples of the divalent aromatic hydrocarbon group Ar include a phenylene group which may be substituted by an alkyl group as represented by the following formula

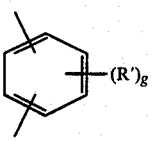

wherein R' and g are as defined hereinabove, a naphthylene group which may be substituted by an alkyl group as represented by the following formula

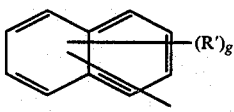

wherein R' and g are as defined hereinabove, and a diphenylene group which may be substituted by an alkyl group as represented by the following formula

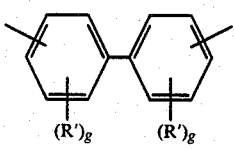

wherein R' and g are as defined hereinabove.

Examples of the phenylene group which may be substituted by an alkyl group are phenylene, methylphenylene, ethylphenylene, dimethylphenylene and isopropylphenylene.

Examples of the naphthyl group which may be substituted by an alkyl group are 1,4-, 1,5-, 2,6- or 2,7- naphthylene, methylnaphthylene and ethylnaphthylene.

Examples of the diphenylene groups which may be substituted by an alkyl group are 4,4'-diphenylene and methyldiphenylene.

Examples of the third group compounds of formula (VI) are as follows.

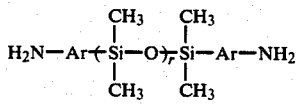 (VI)'

 (VI)''

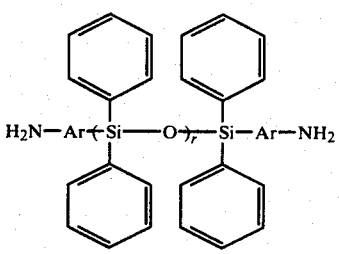

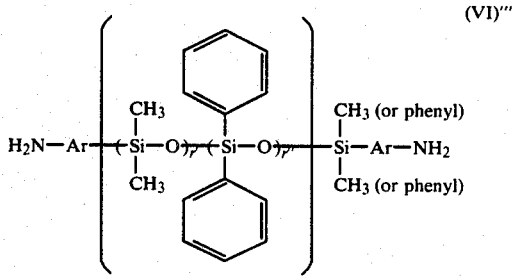 (VI)'''

In these formulae, Ar, r, r' and r'' are the same as defined above.

The silicon-containing polyamines of formula (VI) can be produced, for example, as follows.

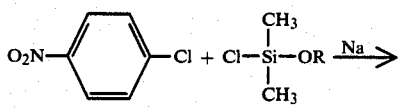

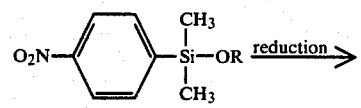

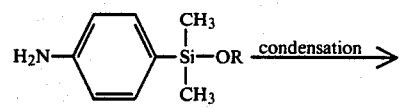

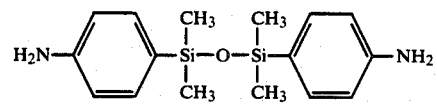

As another example, the silicon-containing polyamines used in this invention may be a fourth group of compounds represented by the following formula (VII)

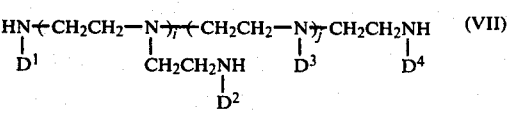 (VII)

wherein $D^1$, $D^2$, $D^3$ and $D^4$, independently from each other, represent a hydrogen atom or a group of the formula (VII)-1

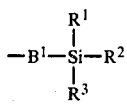   (VII)-1 in which $B^1$, $R^1$, $R^2$ and $R^3$ are as defined hereinabove, i and j are identical or different and each represents zero or a positive number, provided that the sum of i and j is at least 2, and at least one group of formula (VII)-1 is contained in the molecule.

Examples of the group of formula (VII)-1 in the definitions of $D^1$, $D^2$, $D^3$ and $D^4$ in formula (VII) will be apparent from the description above with regard to formula (I).

The compounds of formula (VII) are usually produced by reacting polyethyleneimine with, for example, compounds of the formula:

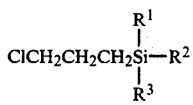

The sum of i and j is determined by the degree of polymerization of polyethyleneimine used, and is usually 4 to 5000.

Examples of the compounds of formula (VII) are compounds represented by the following formula

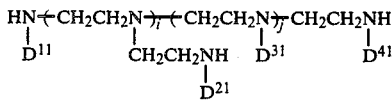

wherein $D^{11}$, $D^{21}$, $D^{31}$ and $D^{41}$, independently for each other, represent a hydrogen atom or $-CH_2-_3Si-CH_3)_3$.

POLYSILOXANE-TYPE COMPOUND (B)

The polysiloxane-type compound (B) has at least two acidic hydroxyl groups in the molecule.

Examples of the polysiloxane-type compound used in this invention are compounds containing at least two bonded units of the following formula (VIII) in the molecule.

   (VIII)

wherein $R^{26}$ represents a monovalent hydrocarbon or fluorinated hydrocarbon group having 1 to 18 carbon atoms.

In formula (VIII), examples of the monovalent hydrocarbon group or fluorinated hydrocarbon group for $R^{26}$ are the same as those given for $R^1$ hereinabove. For example, $R^{26}$ is a monovalent hydrocarbon group such as an alkyl group having 1 to 18 carbon atoms, phenyl, tolyl or benzyl, or a monovalent fluorinated hydrocarbon group such as perfluoromethyl, perfluoroethyl, 2-trifluoromethylethyl or trifluorophenylmethyl.

Preferably, in the polysiloxane-type compounds having the bonded units of formula (VIII), all of the bonded units of formula (VIII) form bonded units of the following formula (VIII)-a.

   (VIII)-a wherein $R^{26}$ is as defined above.

The polysiloxane-type compound having the bonded units of formula (VIII)-a is represented, for example, by the following formula (VIII)-b

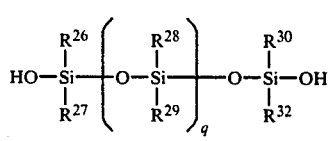   (VIII)-b wherein $R^{26}$, $R^{27}$, $R^{28}$, $R^{29}$, $R^{30}$ and $R^{32}$ are identical or different and each represents a monovalent hydrocarbon or fluorinated hydrocarbon group having 1 to 18 carbon atoms, and q is a positive number.

The number q is preferably 10 to 3000, more preferably 100 to 2000. It can be said that as q is smaller, the solubility of the polysiloxane-type compounds has higher solubility in solvents, and on the other hand, as q is larger, a film formed from the resulting polymer has higher strength.

Examples of the polysiloxane-type compound of formula (VIII)-b having the units of formulae (VIII) and (VIII)-a are given below.

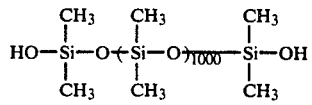   (200)

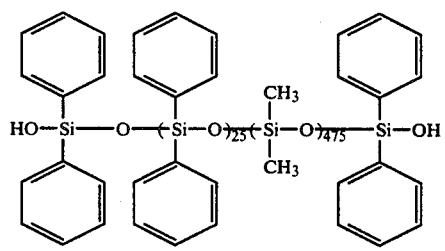   (202)

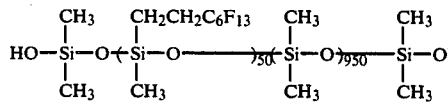   (204)

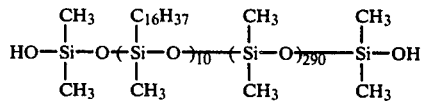   (206)

The polysiloxane-type compounds can be easily produced by methods known per se.

POLYISOCYANATE (C)

The polyisocyanate contains at least two isocyanate groups in the molecules.

A first group of polyisocyanates used in this invention are silicon-containing polyisocyanates. A first subgroup of the silicon-containing polyisocyanates of the first group includes compounds represented by the following formula (IX)

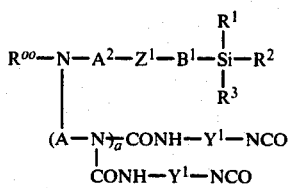     (IX)

wherein
$R^1$, $R^2$, $R^3$, $B^1$, $A^2$, $A^1$ and a are as defined hereinabove, $Y^1$ represents a hydrocarbon group having 3 to 15 carbon atoms, $R^{oo}$ represents a hydrogen atom, an alkyl group having 1 to 6 carbon atoms, a group of the following formula (IX)-1

     (IX)-1 in which $Y^1$ is as defined,
a group of the following formula (IX)-2

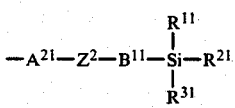     (IX)-2 in which $A^{21}$, $B^{11}$, $R^{11}$, $R^{21}$ and $R^{31}$ are the same as defined for formula (I)-2, and $Z^2$ represents a single bond or a group of the following formula (IX)-3

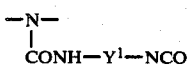     (IX)-3 wherein $Y^1$ is as defined above, or $R^{oo}$ and $A^2$ may be bonded to each other to form a 5- to 7-membered ring together with the nitrogen atom to which they are bonded, and $Z^1$ is a group selected from the definition of $Z^2$.

The polyisocyanate represented by formula (IX) can be produced by reacting the silicon-containing polyamine (I) above with a diisocyanate compound of the following formula

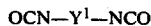     (XIII)

wherein $Y^1$ is as defined above, in a manner known per se using about 1.8 to 2.2 moles of the diisocyanate compound per equivalent of the primary and/or secondary amino groups of the polyamine.

Compounds of formula (IX) in which $Z^1$ and $Z^2$ are single bonds are produced by using polyamines of formula (I) in which b and b' are zero. Compounds of formula (IX) in which $Z^1$ and $Z^2$ are the group of formula (XI)-3 are produced by using polyamines of formula (I) in which b and b' are 1.

Compounds of formula (IX) in which $R^{oo}$ is the group of formula (IX)-1 are produced by using polyamines of formula (I) in which $R^o$ is a hydrogen atom. Compounds of formula (IX) in which $R^{oo}$ is the group of formula (IX)-2 are produced by using polyamines of formula (I) in which $R^o$ is the group of formula (I)-2.

The definitions of $R^1$, $R^2$, $R^3$, $B^1$, $A^2$, $A^1$ and a are apparent from the definitions given above for formula (I).

$Y^1$ in formulae (IX) and (XIII) is a hydrocarbon group having 3 to 15 carbon atoms, and details of it will become apparent from a description of the hydrocarbon-type polyisocyanates to be given hereinbelow. For example, $Y^1$ can be an alkylene, cycloalkylene, arylene or alkylene-arylene-alkylene group having 3 to 15 carbon atoms.

Examples of the silicon-containing polyisocyanate of formula (IX) are shown below.

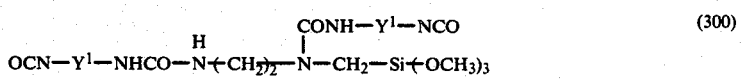     (300)

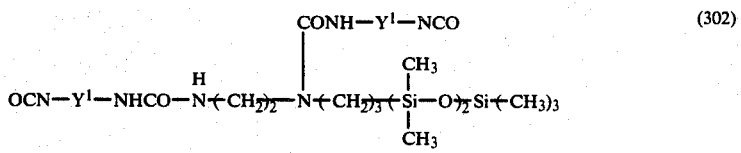     (302)

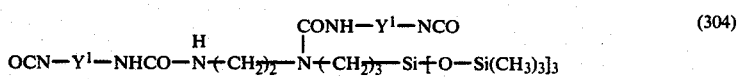     (304)

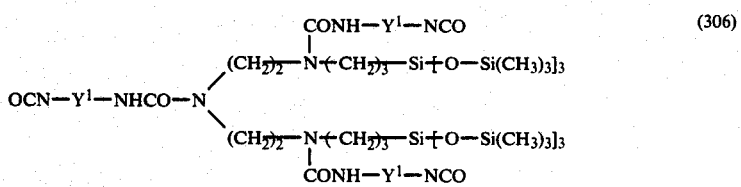     (306)

-continued

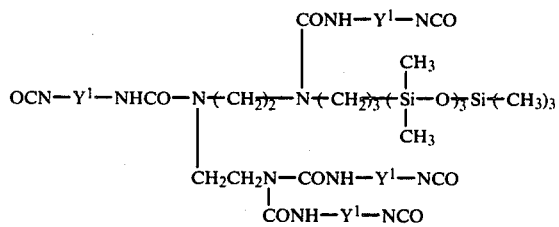 (308)

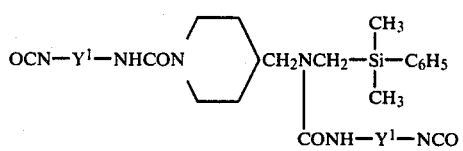 (310)

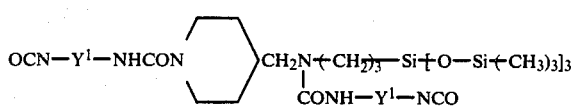 (312)

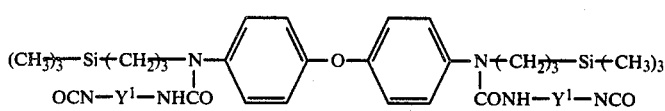 (314)

A second sub-group of the silicon-containing polyisocyanates includes compounds of the following formula (X)

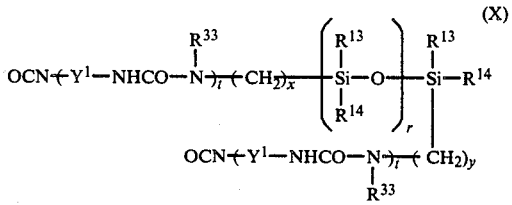 (X)

wherein $R^{13}$, $R^{14}$, $Y^1$, r, x and y are the same as defined hereinabove, $R^{33}$ is a hydrogen atom or a group selected from the definition of $R^{13}$, and t is zero or 1.

Polyisocyanates of formula (X) in which t is 1 can be produced by reacting the silicon-containing polyamine (IV) with the diisocyanate compound of formula (XIII). Polyisocyanates of formula (X) in which t is zero can be produced by reacting silicon-containing polyamines of formula (IV) in which $R^{15}$, $R^{16}$, $R^{17}$ and $R^{18}$ are hydrogen atoms with phosgene.

The definitions of $R^{13}$, $R^{14}$, $Y^1$, r, x and y are apparent from the definitions given hereinabove for formula (IV).

$R^{33}$ in formula (X) is a hydrogen atom or a group selected from the definition of $R^{13}$, namely a monovalent hydrocarbon, fluorinated hydrocarbon or trihydrocarbon silyl hydrocarbon group having 1 to 16 carbon atoms.

Examples of the second sub-group compounds include the following.

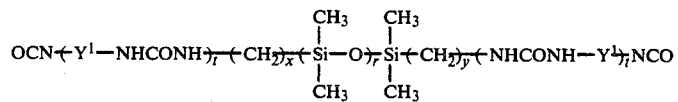 (400).

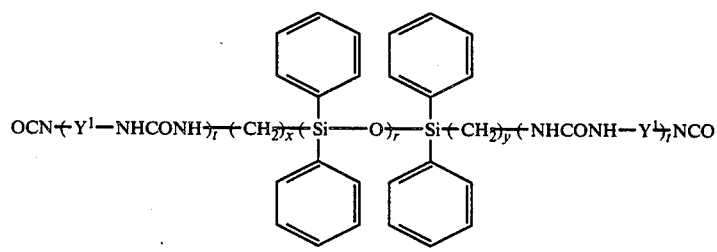 (402).

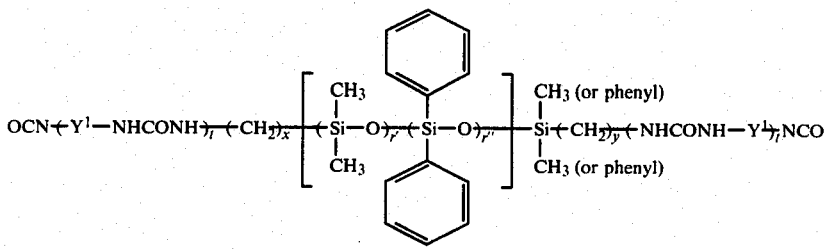
(404).

A third sub-group of the silicon-containing polyisocyanates includes compounds represented by the following formula (XI)

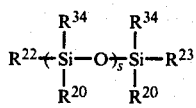
(XI)

wherein the definition of $R^{20}$, $R^{22}$, $R^{23}$ and s are the same as in formula (V), and a plurality of $R^{34}$ groups are identical or different and each is a group selected from the definition of $R^{13}$ or a group of the following formula (XI)-1

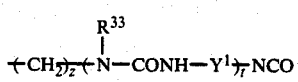
(XI)-1 wherein $R^{33}$, $Y^1$, t and z are as defined above, provided that at least two groups of formula (XI)-1 are contained in the molecule.

Polyisocyanates of formula (XI) in which t is 1 can be produced by reacting the silicon-containing polyamines of formula (v) with the diisocyanate compounds of formula (XIII). Polyisocyanates of formula (XI) in which t is zero can be produced by reacting compounds of formula (V) in which both $R^{24}$ and $R^{25}$ are hydrogen atoms with phosgene.

The definitions of $R^{20}$, $R^{22}$, $R^{23}$ and s are apparent from the definitions given above for formula (V).

$R^{34}$ in formula (XI) is a group selected from the definitions of $R^{13}$, and is a monovalent hydrocarbon or fluorinated hydrocarbon or tri-hydrocarbon silyl hydrocarbon group having 1 to 16 carbon atoms.

Examples of the third sub-group compounds are shown below.

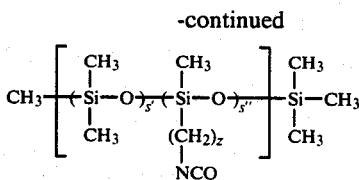
(500).

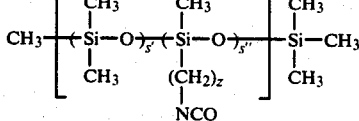
(502).

A fourth sub-group of the silicon-containing polyisocyanates includes compounds of the following formula (XII)

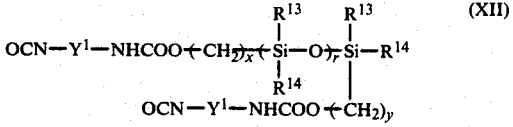
(XII)

wherein $R^{13}$, $R^{14}$, $Y^1$, x, y and r are the same as defined hereinabove.

The polyisocyanates of formula (XII) can be produced by reacting hydroxyalkyl-terminated siloxanes represented by the following formula (XIV)

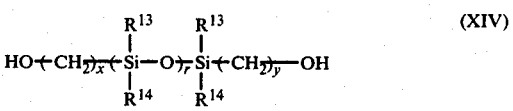
(XIV)

wherein $R^{13}$, $R^{14}$, x, y and r are the same as defined above, with the diisocyanate compounds of formula (XIII).

An example of the polyisocyanate of formula (XII) is as follows:

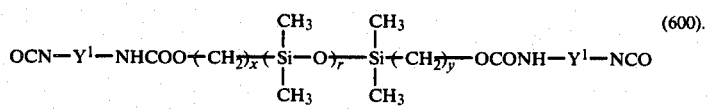
(600).

A second group of the polyisocyanates used in this invention includes hydrocarbon-type polyisocyanates.

Preferably, the hydrocarbon-type polyisocyanates are aliphatic diisocyanates having 3 to 17 carbon atoms, alicyclic diisocyanates having 8 to 17 carbon atoms, aralkyl diisocyanates having 9 to 17 carbon atoms, monocyclic or dicyclic aromatic diisocyanates having 8 to 17 carbon atoms, tricyclic or higher aromatic tri-to dodeca-isocyanates having about 23 to about 100 carbon atoms.

The aliphatic diisocyanates having 3 to 17 carbon atoms can be represented by the following formula

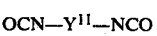
(XII)-a wherein $Y^{11}$ represents an alkylene group having 1 to 15 carbon atoms.

Examples of $Y^{11}$ are methylene, ethylene, trimethylene, alpha-methylethylene, tetramethylene, pentamethylene, alpha-methyltetramethylene, hexamethylene, heptamethylene, 2,2-dimethylpentamethylene, octamethylene, nonamethylene, decamethylene, undecamethylene, docecamethylene, tridecamethylene, tetradecamethylene and pentadecamethylene. Of these, ethylene, hexamethylene and 2,2-dimethylpentamethylene are especially preferred.

Examples of the alicyclic diisocyanates having 8 to 17 carbon atoms include 1,3-diisocyanatocyclohexane, 1,3-diisocyanato-4-methylcyclohexane, 1,3-bis-(isocyanatemethyl)cyclohexane, bis(4-isocyanatocyclohexyl)methane, 1,1-bis(4-isocyanatocyclohexyl)ethane, 2,2-bis(4-isocyanatocyclohexyl)propane and isophorone diisocyanate. Of these, 1,3-diisocynatocyclohexane, 1,3-diisocynato-4-methylcyclohexane, bis(4-isocynatocyclohexyl)methane and isophorone diisocyanate are especially preferred.

Examples of the monocyclic or dicyclic aromatic diisocyanates having 8 to 17 carbon atoms include 1,3-phenylene diisocyanate, 2,4-tolylene diisocyanate, 2,6-tolylene diisocyanate, 2,4- and 2,6-tolylene diisocyanate mixture, m- or p-xylylenediisocyanate, 3,4'-diphenyl ether diisocyanate, 4,4'-diphenyl ether diisocyanate, 4,4'-diphenylmethane diisocyanate, 1-isocyanato-4-isocyanatomethylbenzene and

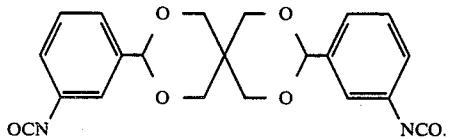

Examples of the tricyclic or higher aromatic trito dodeca-isocyanates are compounds of the following formula

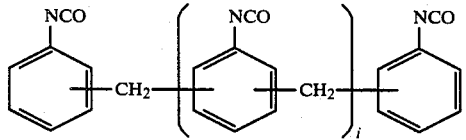

wherein i is an integer of 1 to 10.

SILICON-CONTAINING POLYMER

The silicon-containing polymer of this invention can be produced by reacting at least one silicon-containing polyamine (A), at least one polysiloxane-type compound (B) having at least two acidic hydroxyl groups and at least one polyisocyanate (C).

It is believed that the silicon-containing polymer of this invention contains
(1) polyaddition bonded units derived from the silicon-containing polyamine and the polyisocyanate,
(2) polyaddition bonded units derived from the polysiloxane-type compound and the polyisocyanate, and
(3) condensation units derived from the silicon-containing polyamine and the polysiloxane-type compound.

The proportions of the units (1) to (3) depend upon the proportions of the starting materials used, and also upon the sequence of reactions between the starting materials.

The polyaddition bonded units (1) mean recurring units containing a urea linkage formed by the reaction of the silicon-containing polyamine with the polyisocyanate. The polyaddition units (2) mean recurring units containing a urethane linkage formed by the reaction of the polysilolxane-type compound with the polyisocyanate. The condensation units (3) are believed to be recurring units containing an ether linkage formed by condensation reaction between the silicon-containing polyamine and the polysiloxane-type compound with elimination of amine or ammonia.

Investigations of the present inventors have shown that when the compound of formula (I) is used as the silicon-containing polyamine (A), a silicon-containing polymer in accordance with this invention having the same properties as in the case of using the three components (A), (B) and (C) can be obtained even if the polysiloxane-type compound (B) is not used.

Accordingly, the present invention also provides an ultrathin film composed substantially of a silicon-containing polymer comprising bonded units derived from the silicon-containing polyamine (A) of formula (I) and the polyisocyanate (C). It is believed that this silicon-containing polymer comprises the polyaddition bonded units (1) because the component (B) is not used.

ULTRATHIN FILM COMPOSED OF THE SILICON-CONTAINING POLYMER

The ultrathin film of the silicon-containing polymer in accordance with this invention can be obtained as a composite structure by reacting the polyamine (A), the polysiloxane-type compound (B) and the polyisocyanate (C) on a supporting microporous substrate to form an ultrathin film on the substrate.

According to the present invention, the composite structure can be advantageously produced by any of the following three process variations.

A first process variation comprises
(1) applying a solution containing (A) a silicon-containing polyamine containing at least two primary and/or secondary amino groups not directly bonded to the silicon atom in the molecule and (B) a polysiloxane-type compound (b) containing at least two acidic hydroxyl groups in the molecule to a supporting microporous substrate, and thereafter,
(2) applying a solution containing (C) a polyisocyanate having at least two isocyanate groups in the molecule and being capable of forming an interface with the solution used in step (1) to the supporting microporous substrate to which the solution has been applied in step (1), whereby an ultrathin film is formed on the supporting microporous substrate by an interfacial reaction taking place among said compounds.

A second process variation comprises
(1) applying a solution containing (A) a silicon-containing polyamine containing at least two primary and/or secondary amino groups not directly bonded to the silicon atom in the molecule to a supporting microporous substrate, and thereafter
(2) applying a solution containing (B) a polysiloxane-type compound containing at least two acidic hydroxyl groups in the molecule and (C) a polyisocyanate containing at least two isocyanate groups in the molecule and being capable of forming an interface with the solution used in step (1) to the supporting substrate to which the solution has been applied in step (1), whereby an ultrathin film is formed on the microporous substrate by an interfacial eaction taking place among said compounds.

A third process variation comprises (1) preparing (a) a solution containing (A) a silicon-containing polyamine containing at least two primary and/or secondary amino groups not directly bonded to the silicon atom in the molecule, (b) a solution containing (B) a polysiloxane-type compound containing at least two acidic hydroxyl groups in the molecule, and (c) a solution containing (C) a polyisocyanate containing at least two isocyanate groups in the molecule, (2) applying one of the solutions (a), (b) and (c) to a supporting microporuos substrate, and thereafter, (3) applying the remaining two solutions successively, each of the two solutions forming an interface with the solution applied in step (2), whereby an ultrathin film formed on the supporting microporous substrate by an interfacial reaction taking place among said compounds.

Preferred embodiments of the third process variation are as follows: The solution containing the polyamine (A) is applied first in step (2), and in step (3), the solution containing the polyisocyanate (C) is applied and then the solution containing the polysiloxane-type compound (B) is applied; in step (2), the solution containing the polyamine (A) is applied, and thereafter in step (3), the solution containing the polysiloxane-type compound (B) is applied and then the solution containing the polyisocyanate (C) is applied; in step (2), the solution containing the polyisocyanate (C) is applied, and then in step (3), the solution containing the polyamine (A) is applied and then the solution containing the polysiloxane-type compound (B) is applied; and in step (2), the solution containing the polyisocyanate (C) is applied, and in step (3), the solution containing the polysiloxane-type compound (B) is applied and then the solution containing the polyamine (A) is applied. Of these, the embodiments described in the first and third places are especially preferred.

Examples of solvents used for the silicon-containing polyamine in the above three process variations are water, methanol, ethanol, isopropanol, methyl Cellosolve, dioxane, ethylene glycol, diethylene glycol, triethylene glycol, glycerol, n-hexane, n-decane, hexadecene, benzene, toluene and xylene. Two or more of these solvents may be used as a mixture.

Examples of solvents for the polysiloxane-type compound include methanol, ethanol, isopropanol, methyl Cellosolve, dioxane, ethylene glycol, diethylene glycol, triethylene glycol, glycerol, hexane, n-heptane, n-octane, cyclohexane, n-decane, n-tetradecane, hexcadecene, benzene, toluene, xylene, carbon tetrachloride and trifluorotrichloroethylene. They may be used as a mixture.

Examples of solvents for the polyisocyanate include aliphatic, alicyclic or aromatic hydrocarbons having 6 to 18 carbon atoms, halogenated hydrocarbons having 6 to 18 carbon atoms, and ketones. Specific examples are n-hexane, n-heptane, n-octane, n-decane, tetradecane, hexadecene, cyclohexane, benzene, toluene, xylene, carbon tetrachloride, trifluorotrichloroethylene, methyl ethyl ketone and dipropyl ketone. Mixtures of these may also be used.

To prepare the solution used in process (1) of the first process variation and the solution used in step (2) of the second process variation, a common solvent for the two compounds described in each of these step is naturally used.

The silicon-containing polyamine is used in a concentration of 10 ppm to 10% by weight, more preferably 100 ppm to 5% by weight. The polysiloxane-type compound is used in a concentration of preferably 100 ppm to 10% by weight, more preferably 5000 ppm to 5% by weight. The polyisocyanate is used in a concentration of preferably 10 ppm to 10% by weight, more preferably 100 ppm to 5% by weight.

The solvent for the solution used in step (1) and the solvent for the solution used in step (2) in the first and second process variations should form an interface. The solvent for the solution used in step (1) and the solvent for the solution used first in step (3) in the third process variation should form an interface. Also, the solvent for the solution used in step (2) and each of the solvent for the solution used in step (3) in the third process variation should form an interface.

When the solvents capable of forming an interface are mixed, they separate into two phases. Desirably, therefore, the two solvents do not form a complete solution. But those which dissolve in each other to some extent but form two phases may be used.

The film forming method in accordance with this invention involves formation of a film on an interface, and is characterized in that a thin film having a thickness of not more than 1 micrometer and being free from defects can be easily formed.

Various methods of coating can be used in this invention depending upon the shape of the supporting microporous substrate and the types of the solvents used. For example, dip coating, roll coating, and spray coating methods can be used.

For example, when the supporting substrate is a flat film, a film may be prepared by dipping the supporting substrate in a solution, withdrawing it from the solution, removing the excess solution from the substrate, and again dipping it in another solution capable of forming an interface with the first solution thereby to form an interface on the supporting microporous substrate and thus form a film on it.

When the supporting substrate is in the form of a hollow filament, a film may be formed on the outside of the hollow filament substrate by dipping it in a reaction solution in such a manner that the solution does not get inside the filament. Or a film may be formed by allowing a reaction solution to flow successively through the inside of the hollow filament. The method of forming a film inside the hollow filament is very advantageous in regard to the handling of the film because an ultrathin film having low mechanical strength can be handled without touching it.

After film formation, the unreacted compound or solvents may be washed away with water or an organic solvent having a low boiling point and/or a low viscosity. Or the film may be heat-treated to complete the reaction. The heat-treating temperature is that temperature which does not cause deformation of the supporting substrate or the film, and is usually 200° to 50° C. The heat-treatment time is 1 to 120 minutes to obtain good results.

Examples of the supporting microporous substrate are inorganic porous substrates such as a porous glass substrate, a sintered metal substrate or a ceramic substrate, and organic porous substrates made from a cellulose esters, polystyrene, polyvinyl butyral, polysulfone, aromatic polyamides, and polyvinyl chloride. Porous substrates of polysulfone or aromatic polyamides are preferred. The polysulfone porous substrates are described in OSW Report No. 359. Methods for preparing these porous substrates in the form of a flat membrane are known, and some of such substrates are commercially available.

In the present invention, these porous substrates may be used while being supported on a reinforcing material such as a woven or nonwoven fabric of a polyester or polypropylene. The reinforced porous substrate can be obtained by applying a solution of a polymer such as polysulfone to a reinforcing substrate and converting the solution into a substrate on the reinforcing material, as described in Referential Example given hereinafter.

The porous substrate in the form of a hollow filament is an organic porous substrate, and can be produced, for example, by preparing a dope of a polymer such as polysulfone in a water-miscible mixture, for example a mixture of lithium chloride, 2-alkoxyethanol and N-methyl pyrrolidone, and spinning the dope into water by using a spinning device equipped with an annular orifice known per se while passing water (as a coagulating liquid) into the inside of the annular orifice, coagulating the filament and taking it up. Hollow filaments having various porous properties depending upon the concentration of the polymer in the dope, the temperature and the spinning speed can be produced.

The supporting microporous substrate usually has pores having a size of about 10 to about 5000 Å, preferably about 30 to about 1000 Å. Preferably, the supporting microporous substrate does not have pores having a size above 1 micron, more preferably pores having a size exceeding 0.5 micron. The supporting microporous substrate may be of a symmetrical or asymmetrical structure, preferably the latter. In accordance with another standard, the supporting microporous substrate shows an air permeability, measured by the device shown in JIS P8117, of 20 to 3000 seconds, preferably 50 to 1000 seconds.

The ultrathin film composed of the silicon-containing polymer in accordance with this invention is provided in a thickness of about 0.01 to about 1 micron, preferably about 0.03 to about 0.5 microns.

According to this invention, the ultrathin film of the invention is supported on the supporting microporous substrate to give a composite structure in the form of, for example a flat membrane or a hollow fibrous membrane.

The ultrathin film composed of the silicon-containing polymer can be used to obtain a gaseous mixture containing a specific gas in an enhanced concentration from a mixture of at least two gases. Since the ultrathin film of the present invention is composed of the silicon-containing polymer having the aforesaid specific composition, it shows a high coefficient of oxygen permeation which is 2 to 6 times its coefficient of nitrogen permeation. Hence, it is used to produce a gaseous mixture having a specific gas in an enhanced concentration from a mixture of at least two gases, for example a gaseous mixture containing oxygen in a higher concentration than in air from air. The ultrathin film of the invention, in spite of its very small thickness, has substantially no hole which permits permeation of a gaseous mixture directly. Accordingly, it can produce a gaseous mixture containing a specific gas in an enhanced concentration at a very high speed.

For production of such a gaseous mixture, the ultrathin film of the invention is preferably used as a composite structure supported on a supporting microporous substrate. Such a composite structure is used as a module, or an oxygen enricher, descibed, for example, in U.S. Pat. No. 4,406,673 and European Pat. No. 31725.

Since oxygen-enriched air can be easily produced from air by the ultrathin film of this invention, it serves to increase the efficiency of combustion of engines or heating appliances, nurse premature babies or to cure patients with respiratory diseases. It can also be used as artificial lungs or branchiae.

The ultrathin film of this invention is suitable not only for the production of oxygen-enriched air from air, but also, as shown in Examples below, for the separation of carbon dioxide from a gaseous mixture (such as a combustion gas) composed mainly of carbon dioxide and nitrogen, the separation of helium or argon from a gaseous mixture composed mainly of helium or argon and nitrogen (such as a gaseous mixture obtained by gasification of liquefied helium or argon and mixing of the resulting gas with air), separation of helium from natural gas, or the separation of hydrogen from a gaseous mixture composed mainly of hydrogen, carbon monoxide and methane (for example, water gas).

The follolwing examples illustrate the present invention more specifically.

REFERENTIAL EXAMPLE 1

Production of a hollow porous substrate of polysulfone

A solution was prepared from 20 parts of polysulfone (Udel P3500, a trade name for a product of Nissan Chemical Co., Ltd.), 57 parts of N-methyl-2-pyrrolidone, 3 parts of lithium chloride and 20 parts of 2-metoxyethanol, and extruded from annular slits at 30° C. using water as a core liquid. The extruded filaments were dipped into water at 25° C. to coagulate them.

Thus, hollow porous substrates of polysulfone each having an outside diameter of 800 micrometers and an inside diameter of 500 micrometers were obtained. The hollow substrates were filled in a polycarbonate pipe, and the two end portions were cemented with an adhesive to obtain a hollow filament membraneous module. In a dry state, the amount of air permeated through the hollow filament membrane at 25° C. was $1 \times 10^2$ cc(STP)/cm$^2$.sec.cmHg.

REFERENTIAL EXAMPLE 2

Production of a nonwoven fabric-reinforced porous substrate of polysulfone

A dense Dacron nonwoven fabric (basis weight 180 g/m$^2$) was fixed to a glass plate. A solution composed of 12.5% by weight of polysulfone, 12.5% by weight of methyl Cellosolve and the remainder being dimethylformamide was cast in a layer of about 0.2 micrometer in thickness on the nonwoven fabric, and immediately then, the polysulfone layer was gelled in a water bath at room temperature to obtain a nonwoven fabric-reinforced porous polysulfone substrate.

The resulting porous polysulfone layer had a thickness of about 40 to about 70 micrometers. An electron microphotograph of the surface of the membrane showed the presence of numerous micropores having a size of 50 to 600 Å on its surface. The permeation speed of air through the porous substrate at 25° C. was $5 \times 10^{-2}$ to $1 \times 10^{-3}$ cc/cm$^2$.sec.cmHg.

METHOD OF MEASURING THE SELECTIVE GAS PERMEATING PERFORMANCE

Unless otherwise stated, the selective gas permeating performances of separation membranes in the following Examples were measured by the following methods.

A separation membrane having a predetermined area (inside diameter in the case of a hollow filament-like membrane) was set in a gas separation tester. Air in an amount about 100 times the amount of a permeating gas was supplied at 20° C. The permeating side of the separation membrane was evacuated to a degree of vacuum of 200 mmHg, and the compositions of the supplied air and the permeated gas were analyzed by gas chromatography. The amount of the permeated gas was measured by the soap film meter method. The oxygen permeation speed $K_{O_2}$ (cc/cm$^2$.sec.mmHg) was calculated in accordance with the following equation.

$$K_{O_2} = \frac{\text{Amount of oxygen permeated (cc/sec)}}{\text{Membrane area (cm}^2\text{)} \times \left( \begin{array}{c} O_2 \text{ partial pressure} \\ \text{in mm Hg} \\ \text{on the supply side} \end{array} - \begin{array}{c} O_2 \text{ partial pressure} \\ \text{in mm Hg} \\ \text{on the permeating side} \end{array} \right)}$$

Selectivity ($\alpha$) was calculated in accordance with the following equation.

$$\alpha = \frac{X_{O_2}}{(1 - X_{O_2})} \cdot \frac{[(1 - 0.21) - (1 - X_{O_2})\gamma]}{(0.21 - X_{O_2} \cdot \gamma)}$$

wherein $X_{O_2}$ is the concentration (vol. %) of oxygen in the gas on the permeation side, and $\gamma$ represents the ratio of the total pressure on the permeation side (~200 mmHg) to the total pressure on the supply side (760 to 770 mmHg).

All parts in these examples are by weight.

EXAMPLE 1

The polysulfone porous membrane prepared in Referential Example 2 was immersed for 10 minutes in a solution (1) of 0.15 part of 3-(2-aminoethyl)aminopropylnonamethyldisiloxane of the following formula

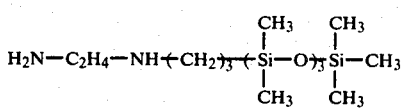

in 50 parts of ethylene glycol. Then, the membrane was withdrawn and the solution was removed.

Separately, a solution (2) was prepared from 0.1 part of 4,4'-diphenyl ether diisocyanate, 0.5 part of polydimethylsiloxane having silanol terminates (average molecular weight 58,000), 0.005 part of methyltrimethoxysilane, 0.0005 part of dibutyltin dilaurate, 50 parts of hexadecene and 49 parts of hexane. Immediately, the above polysulfone porous membrane was dipped for 3 minutes in the resulting solution. Then, it was taken up and the solution was removed.

The porous membrane was heat-treated at 65° C. for 30 minutes, left to stand at room temperature for 24 hours, washed well with hexane and water, and dried in the air to obtain a separation membrane.

The resulting membrane had an oxygen permeation speed of $4.2 \times 10^{-4}$ cc/cm$^2$.sec.cmHg and a selectivity of 3.2.

The CO$_2$ permeation speed was $2.2 \times 10^{-3}$ cc/cm$^2$.sec.cmHg, and the He permeation speed was $1.3 \times 10^{-3}$ cc/cm$^2$.sec.cmHg.

EXAMPLES 2-4

In each run, a separation membrane was produced in the same way as in Example 1 except that each of the silicon-containing polyamines (a), each of the polysiloxane-type compounds (B) and each of the polyisocyanates (C) indicated in Table 1 were used. The selective gas permeation performances of the separation membranes were measured, and the results are shown in Table 1.

TABLE 1

| Example | Silicon containing polyamide (A) | Polysiloxane type compound (B) | Polyisocyanate (C) | O₂ permeation speed(*) | Selectivity |
|---|---|---|---|---|---|
| 2 | $H_2N(CH_2)_2NH(CH_2)_3Si(O-Si(CH_3)_3)_3$ with $CH_3$ group | $HO(Si(CH_3)_2-O)_n H$ (average molecular weight 58,000) | 4,4'-Diphenylmethane diisocyanate | $4.9 \times 10^{-4}$ | 3.0 |
| 3 | $H_2N(CH_2)_3NH(CH_2)_2NH(CH_2)_3Si(O-Si(CH_3)_3)_3$ with $CH_3$ group | $HO(Si(CH_3)_2-O)_n H$ (average molecular weight 58,000) | 4,4'-Diphenylmethane diisocyanate | $2.1 \times 10^{-4}$ | 3.7 |
| 4 | $H_2N(CH_2)_3Si(CH_3)_2-O-[Si(CH_3)_2-O]_{0.7}[Si(CH_3)((CH_2)_3NH_2)-O]_{0.3}-Si(CH_3)_2(CH_2)_3NH_2$, subscript 50 | $HO(Si(CH_3)_2-O)_n H$ (average molecular weight 58,000) | 4,4'-Diphenylmethane diisocyanate | $2.6 \times 10^{-4}$ | 3.4 |
| 5 | $H_2N(CH_2)_3Si(CH_3)_2-O-[Si(CH_3)_2-O]_{0.5}[Si(CH_3)((CH_2)_2CF_3)-O]_{0.5}-Si(CH_3)_2(CH_2)_3NH_2$, subscript 50 | $HO(Si(CH_3)_2-O)_n H$ (average molecular weight 58,000) | Isophorone diisocyanate | $2.5 \times 10^{-4}$ | 3.1 |
| 6 | $H_2N(CH_2)_3Si(CH_3)(C_6H_5)-O-[Si(CH_3)_2-O]_{20}-Si(CH_3)_2(CH_2)_3NH_2$ | $HO(Si(CH_3)_2-O)_n H$ (average molecular weight 58,000) | $OCN(CH_2)_3Si(CH_3)_2-O-Si(CH_3)_2(CH_2)_3NCO$ | $1.5 \times 10^{-4}$ | 3.4 |
| 7 | $H_2N(CH_2)_3Si(CH_3)_2-O-(Si(CH_3)_2-O)_n-Si(CH_3)_2(CH_2)_3NH_2$ | $HO(Si(CH_3)_2-O)_n H$ (average molecular weight 58,000) | 4,4'-Diphenylether diisocyanate | $1.1 \times 10^{-4}$ | 3.9 |

TABLE 1-continued

| Example | Silicon containing polyamide (A) | Polysiloxane type compound (B) | Polyisocyanate (C) | O₂ permeation speed(*) | Selectivity |
|---|---|---|---|---|---|
| 8 | $H_2N$—⌬—$\underset{CH_3}{\underset{|}{Si}}$—O—$\underset{CH_3}{\underset{|}{Si}}$—⌬—$NH_2$ (with CH₃ groups) | $CH_3$<br>HO—(Si—O)ₙ—H<br>$CH_3$<br>(average molecular weight 58,000) | 4,4'-Diphenylether diisocyanate | $0.72 \times 10^{-4}$ | 3.8 |
| 9 | $H_2N$(CH₂)₃Si(CH₃)₂—O—[(Si(CH₃)₂—O)₁₄—(Si(CH₃)(( CH₂)₃NH₂)—O)]ₙ—Si(CH₃)₂—(CH₂)₃NH₂ | $CH_3$<br>HO—(Si—O)ₙ—H<br>$CH_3$<br>(average molecular weight 26,000) | Tolylene diisocyanate | $2.4 \times 10^{-4}$ | 3.3 |
| 10 | (H₃C)₃Si—(CH₂)₃—NH—(CH₂)₃—Si(CH₃)₂—O—Si(CH₃)₂—(CH₂)₃—NH—(CH₂)₃—Si(CH₃)₃ | $CH_3$<br>HO—(Si—O)ₙ—H<br>$CH_3$<br>(average molecular weight 26,000) | 4,4'-Diphenylmethane diisocyanate | $0.81 \times 10^{-4}$ | 4.1 |

(*)cc/cm² · sec · cm Hg

EXAMPLE 11

A 0.1 wt.% ethylene glycol solution of a compound of the following formula

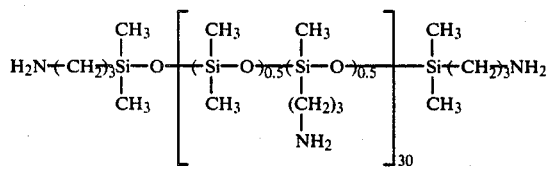

was introduced into the inside of the hollow filament-like polysulfone porous substrate produced in Referential Example 1 and the inside of the substrate was maintained under a pressure of 1 kg/cm$^2$.G for 10 minutes to impregnate the solution into the porous substrate. Then, nitrogen gas was passed through the substrate at a flow rate of 1 liter/min. for 1 minute, and the excess solution was removed from the substrate. Then, a 0.05 wt. % hexadecene solution of isophorone diisocyanate was passed through the inside of the hollow filament at a linear speed of 1 m/min. for 3 minutes. After thorough removal of the excess solution, a solution composed of 0.3 part of polydimethylsiloxane having silanol terminals (average molecular weight 58,000), 0.003 part of methyltrimethoxysilane, 0.0001 part of dibutyltin dilaurate and 99.5 parts of hexane. The excess solution was removed, and the membrane was heated at 80° C. for 30 minutes, air dried for 24 hours, and washed with water to obtain a separation membrane.

The separation membrane was found to have an oxygen permeation speed of $3.6 \times 10^{-4}$ cc/cm$^2$.sec.cmHg and an oxygen/nitrogen selectivity of 3.3.

The CO$_2$ permeation speed was $2.1 \times 10^{-3}$ cc/cm$^2$.sec.cmHg and the He permeation speed was $1.0 \times 10^{-3}$ cc/cm$^2$.sec.cmHg.

EXAMPLES 12-24

In each run, a separation membrane was produced in the same way as in Example 11 except that each of the silicon-containing polyamines (A), each of the polysiloxane-type compounds (B) and each of the polyisocyanates (C) indicated in Table 2 were used. The selective gas permeation performances of the separation membranes were measured, and the results are shown in Table 2.

TABLE 2

| Example | Silicon containing polyamine (A) | Polysiloxane type compound (B) | Polyisocyanate (C) | O₂ permeation speed (cc/cm². sec · cm Hg) | Selectivity |
|---|---|---|---|---|---|
| 12 | $H_2N(CH_2)_2N(H)(CH_2)_2N(H)(CH_2)_3Si(O-Si(CH_3)_3)_2(CH_3)$ | $HO\text{-}(Si(CH_3)_2\text{-}O)_n\text{-}H$ (average molecular weight 58,000) | Xylene diisocyanate | $1.9 \times 10^{-4}$ | 3.6 |
| 13 | $(H_3C)_3Si(CH_2)_3N(H)(CH_2CH_2N(H))_{70}(CH_2CH_2N)_{20}CH_2CH_2N(H)(CH_2)_3Si(CH_3)_3$ with pendant $(CH_2)_2\text{-}(CH_2)_3\text{-}NH\text{-}(CH_2)_3Si(CH_3)_3$ | $HO\text{-}(Si(CH_3)_2\text{-}O)_n\text{-}H$ (average molecular weight 58,000) | 4,4′-Diphenylether diisocyanate | $0.77 \times 10^{-4}$ | 2.8 |
| 14 | $H_2N(CH_2)_3Si(CH_3)_2\text{-}O\text{-}[(Si(CH_3)_2\text{-}O)_{0.8}(Si(CH_3)((CH_2)_2\text{-}NH_2)\text{-}O)_{0.2}]_{100}\text{-}Si(CH_3)_2(CH_2)_3NH_2$ | $HO\text{-}(Si(CH_3)_2\text{-}O)_n\text{-}H$ (average molecular weight 58,000) | 4,4′-Diphenylmethane diisocyanate | $3.9 \times 10^{-4}$ | 3.2 |
| 15 | $H_2N(CH_2)_3Si(CH_3)_2\text{-}O\text{-}[(Si(CH_3)(Ph)\text{-}O)_{0.5}(Si(CH_3)((CH_2)_3NH_2)\text{-}O)_{0.5}]_{50}\text{-}Si(CH_3)_2(CH_2)_3NH_2$ | $HO\text{-}(Si(CH_3)_2\text{-}O)_n\text{-}H$ (average molecular weight 800) | 4,4′-Diphenylmethane diisocyanate | $4.4 \times 10^{-4}$ | 3.0 |
| 16 | $(H_3C)_3Si\text{-}O\text{-}[(Si(CH_3)_2\text{-}O)_{0.5}(Si(CH_3)((CH_2)_3NH(CH_2)_2NH_2)\text{-}O)_{0.5}]_{100}\text{-}Si(CH_3)_3$ | $HO\text{-}(Si(CH_3)_2\text{-}O)_n\text{-}H$ (average molecular weight 26,000) | 4,4′-Diphenylether diisocyanate | $2.2 \times 10^{-4}$ | 3.1 |

TABLE 2-continued

| Example | Silicon containing polyamine (A) | Polysiloxane type compound (B) | Polyisocyanate (C) | Performance of the membrane |  |
|---|---|---|---|---|---|
| | | | | O₂ permeation speed (cc/cm² · sec · cm Hg) | Selectivity |
| 17 | $[(H_3C)_3Si-O-(-Si(CH_3)_2-O-)_{70.5}(-Si(CH_3)(CH_2)_3-O-)_{70.5}]_{100}$ with piperazine N-H group | $HO-(-Si(CH_3)_2-O-)_n H$ (average molecular weight 26,000) | $OCN(CH_2)_3Si(CH_3)_2-O-Si(CH_3)_2-O-Si(CH_3)_2(CH_2)_3NCO$ | $1.8 \times 10^{-4}$ | 3.3 |
| 18 | Structure with phenyl-NH₂ and Si(CH₃)₃ pendant groups | $HO-[-Si(CH_3)(C_8H_7)-O-]_{70.5}[-Si(CH_3)_2-O-]_{70.5}[-Si(CH_3)(Si(CH_3)_3)-O-]_{70.1}-[-Si(CH_3)_2-O-]_{290} Si(CH_3)_3$ | 4,4′-Diphenylmethane diisocyanate | $1.9 \times 10^{-4}$ | 3.0 |
| 19 | $H_2N(CH_2)_3[-Si(CH_3)_2-O-]_{70.5}[-Si(CH_3)((CH_2)_3NH_2)-O-]_{70.5}Si(CH_3)_2(CH_2)_3NH_2$ | $HO-[-Si(CH_3)((CH_2)_2CF_3)-O-]_{750} H$ | 1,5′-Naphthalene diisocyanate | $4.0 \times 10^{-4}$ | 2.9 |
| 20 | $H_2N(CH_2)_3[-Si(CH_3)_2-O-]_{70.7}[-Si(CH_3)((CH_2)_3NH_2)-O-]_{70.3}Si(CH_3)_2(CH_2)_3NH_2$ | $HO-[-Si(CH_3)_2-O-]_n H$ (average molecular weight 58,000) | 3,4′-Diphenylether diisocyanate | $3.3 \times 10^{-4}$ | 3.3 |

TABLE 2-continued

| Example | Silicon containing polyamine (A) | Polysiloxane type compound (B) | Polyisocyanate (C) | $O_2$ permeation speed (cc/cm². sec · cm Hg) | Selectivity |
|---|---|---|---|---|---|
| 21 | $H_2N(CH_2)_3Si(CH_3)_2-O-[(Si(CH_3)_2-O)_{0.7}(Si(O-Si(CH_3)_2-CH_3)(CH_2)_3NH_2-O)_{0.3}]_{50}-Si(CH_3)_2(CH_2)_3NH_2$ | $HO(Si(CH_3)_2-O)_nH$ (average molecular weight 58,000) | Xylene diisocyanate | $3.4 \times 10^{-4}$ | 2.9 |
| 22 | $H_2N(CH_2)_3Si(CH_3)_2-O-[(Si(CH_3)_2-O)_2Si(CH_3)(CH_2)_3NH_2]-CH_3$ | $HO(Si(CH_3)_2-O)_nH$ (average molecular weight 58,000) | 4,4'-Diphenylmethane diisocyanate | $1.0 \times 10^{-4}$ | 3.9 |
| 23 | $H_2N(CH_2)_3NH(CH_2)_3Si(O-Si(CH_3)_3)_3$ $-CH_3$ | $HO(Si(CH_3)_2-O)_nH$ (average molecular weight 58,000) | 4,4'-Diphenylmethane diisocyanate | $4.5 \times 10^{-4}$ | 3.0 |
| 24 | $H_2N(CH_2)_3Si(CH_3)_2-O-[(Si(CH_3)_2-O)_{0.5}(Si(O-Si(CH_3)_2-CH_3)(CH_2)_3NH_2-O)_{0.5}]_{30}-Si(CH_3)_2(CH_2)_3NH_2$ | $HO(Si(CH_3)_2-O)_nH$ (average molecular weight 58,000) | 1,6-Hexamethylene diisocyanate (50 wt. %) 1,3-bis(isocyanatomethyl)cyclohexane (50 wt. %) | $0.91 \times 10^{-4}$ | 2.9 |

EXAMPLE 25

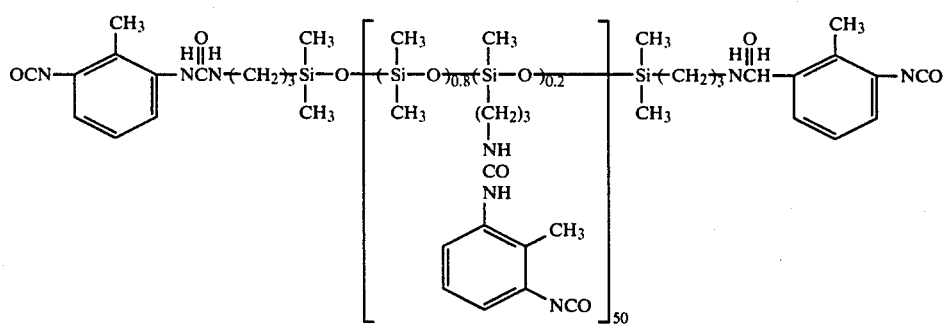

Polyaminopolysiloxane (average molecular weight 4300) represented by the following formula

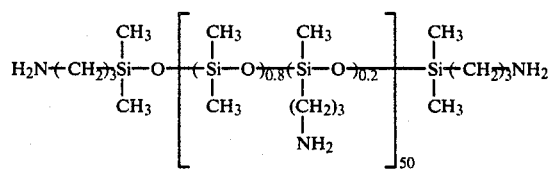

was reacted with a large excess of 2,6-tolylene diisocyanate at 100° C. for 1 hour with sufficient stirring. The reaction product was heated to 150° C. under a pressure of less than 1 mmHg to remove the unreacted 2,6-tolylene diisocyanate. NMR analysis showed that the primary amino groups disappeared, and a polysiloxane-type polyisocyanate represented by the following formula was formed.

A separation membrane was prepared in the same way as in Example 11 except that 0.1 part of the resulting polysiloxane-type polyisocyanate was used instead of isophorone diisocyanate used in Example 11. The separation membrane had an oxygen permeation speed of $4.4 \times 10^{-4}$ cc/cm$^2$.sec.cmHg and a selectivity of 2.9.

EXAMPLES 26–32

In each run, a polyisocyanate (C) was produced in the same way as in Example 25 using each of the polyamines and each of the diisocyanates indicated in Table 3.

A separation membrane was prepared in accordance with the process described in Example 1 or 11 using the polyisocyanate (C) and each of the silicon-containing polyamines (A) and each of the polysiloxane-type compounds (B) indicated in Table 3, and its selective gas permeating performances were measured, The results are shown in Table 3.

TABLE 3

| Example | Polyamino compound | Diisocyanate |
|---|---|---|
| 26 | H$_2$N$\pm$CH$_2\xrightarrow{}_2$NH$\pm$CH$_2\xrightarrow{}_3$Si$\pm$O—Si(CH$_3$)(CH$_3$)—CH$_3$)$_3$ | Tolylene diisocyanate |
| 27 | H$_3$C—Si(CH$_3$)(CH$_3$)—O—[(Si(CH$_3$)—O)$_{0.5}$(Si((CH$_2$)$_3$NH$_2$)—O)$_{0.5}$]$_{100}$—Si(CH$_3$)(CH$_3$)—CH$_3$ | Tolylene diisocyanate |
| 28 | H$_3$C—SiC(CH$_3$)(CH$_3$)—O—[(Si(CH$_3$)—O)$_{0.5}$(Si((CH$_2$)$_3$-piperazinyl)—O)$_{0.5}$]$_{100}$—Si(CH$_3$)(CH$_3$)—CH$_3$ | Tolylene diisocyanate |
| 29 | H$_2$N$\pm$CH$_2\xrightarrow{}_3$Si(CH$_3$)(CH$_3$)—O—[(Si((CH$_2$)$_3$CF$_3$)—O)$_{0.2}$(Si(CH$_3$)—O)$_{0.8}$]$_{50}$—Si(CH$_3$)(CH$_3$)$\pm$CH$_2\xrightarrow{}_3$NH$_2$ | Xylene diisocyanate |

TABLE 3-continued

| Ex. | Structure | Diisocyanate |
|---|---|---|
| 30 | $H_2N\text{-}C_6H_4\text{-}Si(CH_3)_2\text{-}O\text{-}[Si(CH_3)_2\text{-}O]_{20}\text{-}Si(CH_3)_2\text{-}C_6H_4\text{-}NH_2$ | Xylene diisocyanate |
| 31 | $H_2N\text{-}(CH_2)_2\text{-}NH\text{-}(CH_2)_2\text{-}N[(CH_2)_3\text{-}Si(CH_3)_2\text{-}O\text{-}Si(CH_3)_3]_3$ | 1,3-bis-(isocyanatemethylcyclohexane) |
| 32 | $H_3C\text{-}NH\text{-}(CH_2)_3\text{-}Si(CH_3)_2\text{-}O\text{-}[Si(CH_3)_2\text{-}O]_{20}\text{-}Si(CH_3)_2\text{-}(CH_2)_3\text{-}NH\text{-}CH_3$ | 1,3-bis-(isocyanatemethylcyclohexane) |

| Example | Silicon-containing polyamine (A) | Polysiloxane type compound (B) | $O_2$ permeation speed (cc/cm$^2$·sec·cmHg) | Selectivity |
|---|---|---|---|---|
| 26 | $H_2N\text{-}(CH_2)_3\text{-}Si(CH_3)_2\text{-}O\text{-}\{[Si(CH_3)_2\text{-}O]_{0.7}[Si(CH_3)((CH_2)_3NH_2)\text{-}O]_{0.3}\}_{100}\text{-}Si(CH_3)_2\text{-}(CH_2)_3\text{-}NH_2$ | $HO\text{-}[Si(CH_3)_2\text{-}O]_n\text{-}H$ (average molecular weight = 58,000) | $2.4 \times 10^{-4}$ | 3.0 |
| 27 | $H_2N\text{-}(CH_2)_2\text{-}NH\text{-}(CH_2)_2\text{-}NH\text{-}(CH_2)_3\text{-}Si\text{-}[O\text{-}Si(CH_3)_3]_3$ | $HO\text{-}[Si(CH_3)_2\text{-}O]_n\text{-}H$ (average molecular weight = 58,000) | $2.6 \times 10^{-4}$ | 2.9 |
| 28 | $H_2N\text{-}(CH_2)_3\text{-}Si(CH_3)_2\text{-}O\text{-}\{[Si(CH_3)_2\text{-}O]_{0.7}[Si(CH_3)((CH_2)_3NH_2)\text{-}O]_{0.3}\}_{100}\text{-}Si(CH_3)_2\text{-}(CH_2)_3\text{-}NH_2$ | $HO\text{-}[Si(CH_3)_2\text{-}O]_n\text{-}H$ (average molecular weight = 58,000) | $4.1 \times 10^{-4}$ | 3.1 |
| 29 | $H_2N\text{-}(CH_2)_3\text{-}Si(CH_3)_2\text{-}O\text{-}\{[Si(CH_3)_2\text{-}O]_{0.7}[Si(CH_3)((CH_2)_3NH_2)\text{-}O]_{0.3}\}_{100}\text{-}Si(CH_3)_2\text{-}(CH_2)_3\text{-}NH_2$ | $HO\text{-}[Si(CH_3)_2\text{-}O]_n\text{-}H$ (average molecular weight = 58,000) | $3.3 \times 10^{-4}$ | 3.0 |
| 30 | $H_2N\text{-}(CH_2)_3\text{-}Si(CH_3)_2\text{-}O\text{-}\{[Si(CH_3)_2\text{-}O]_{0.7}[Si(CH_3)((CH_2)_3NH_2)\text{-}O]_{0.3}\}_{100}\text{-}Si(CH_3)_2\text{-}(CH_2)_3\text{-}NH_2$ | $HO\text{-}[Si(CH_3)_2\text{-}O]_n\text{-}H$ (average molecular weight = 26,000) | $3.5 \times 10^{-4}$ | 3.1 |
| 31 | $H_2N\text{-}(CH_2)_3\text{-}Si(CH_3)_2\text{-}O\text{-}[Si(CH_3)_2\text{-}O]_{20}\text{-}Si(CH_3)_2\text{-}(CH_2)_3\text{-}NH_2$ | $HO\text{-}[Si(CH_3)_2\text{-}O]_n\text{-}H$ (average molecular weight = 26,000) | $2.7 \times 10^{-4}$ | 3.0 |
| 32 | $H_2N\text{-}(CH_2)_2\text{-}NH\text{-}(CH_2)_2\text{-}Si(CH_3)_3$ | $HO\text{-}[Si(CH_3)_2\text{-}O]_n\text{-}H$ (average molecular weight = 26,000) | $1.1 \times 10^{-4}$ | 3.4 |

*Solvent used for membrane formation: hexadecene/N—methylpyrrolidone = 95/5 (by weight)

EXAMPLE 33

A solution of 0.1 part of a silicon-containing polyamine (A) represented by the following formula

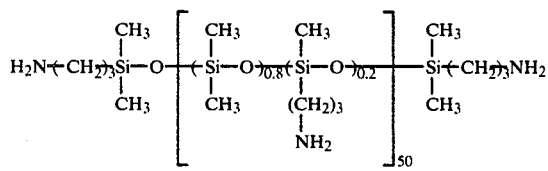

EXAMPLES 34-37

In each run, a separation membrane was prepared in the same way as in Example 33 except that the silicon-containing polyamine (A) and the polyisocyanate (C) were changed as indicated in Table 4. The selective gas permeation properties of the resulting separation membranes are shown in Table 4.

TABLE 4

| Example | Silicon-containing polyamine (A) | Isocyanate | Performance of the membrane $O_2$ permeation speed (cc/cm$^2$.sec.cmHg) | Selectivity |
|---|---|---|---|---|
| 34 | $H_2N(CH_2)_2NH(CH_2)_2N(H)(CH_2)_3Si(O-Si(CH_3)_2-CH_3)_3$ | Toluene diisocyanate | $1.0 \times 10^{-4}$ | 3.3 |
| 35 | $H_2N(CH_2)_3Si(CH_3)_2-O-Si(CH_3)_2-O-Si(CH_3)_2(CH_2)_3NH_2$ | 4,4'-Diphenyl ether diisocyanate | $0.95 \times 10^{-4}$ | 3.5 |
| 36 | (polysiloxane structure with pendant $(CH_2)_3NH(CH_2)_2NH_2$, block ratio 0.7/0.3, n=100) | 4,4'-Diphenyl methane diisocyanate | $1.1 \times 10^{-4}$ | 2.9 |
| 37 | (aryl-terminated polysiloxane with pendant $(CH_2)_3NH_2$, 0.7/0.3, n=100) | 1,5-Naphthalene diisocyanate | $0.98 \times 10^{-4}$ | 3.0 |

0.2 part of polydimethylsiloxane (average molecular weight 12,000) having silanol terminals, 0.002 part of methyltrimethoxysilane and 0.0001 part of dibutyltin dilaurate in a mixture of 15 parts of ethylene glycol and 84.7 parts of ethanol was prepared. The flat polysulfone porous substrate produced in Referential Example 1 was immersed in the solution and withdrawn, and the excess solution was removed.

Separately, a solution of 0.1 part of a polyisocyanate (C) represented by the following formula

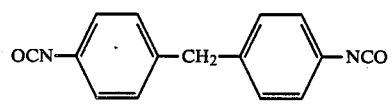

in 99.9 parts of hexadecene was prepared. The above flat polysulfone porous substrate after removal of the excess solution was immersed for 3 minutes, and withdrawn, and the excess solution was removed. It was then heat-treated at 80° C. for 30 minutes, left to stand at room temperature for 24 hours, washed with hexane and water, and air-dried to obtain a separation membrane. The separation membrane had an oxygen permeation speed of $2.1 \times 10^{-4}$ cc/cm$^2$.sec.mmHg and a selectivity of 2.9.

EXAMPLE 38

The hollow filament-like support obtained in Referential Example 1 was cut to a fixed length. The cut pieces were filled in a polycarbonate pipe with their ends aligned regularly. Both end portions of the pipe were cemented by an adhesive to obtain a hollow filament membrane module.

In a dry condition, this hollow filament membrane support had an air permeation amount at 25° C. of $8 \times 10^{-3}$ cc/cm$^2$.sec.cmHg.

A 0.1% by weight ethylene glycol solution of a silicon-containing polyamine (A) represented by the following formula

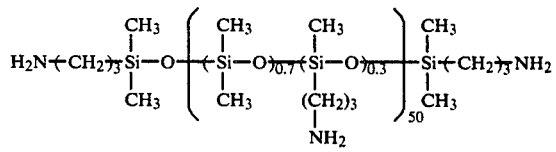

was passed through the inside of the polysulfone hollow filament support, and while the solution was inside the support, the inside of the support was maintained under a pressure of 1 kg/cm$^2$-G for 10 minutes to impregnate the amine solution into the porous membrane.

Then, nitrogen gas was passed through the porous membrane at a flow rate of 1 liter/min. for 3 minutes to remove the excess solution. A solution composed of 0.3 part of polydimethylsiloxane (average molecular weight 58,000) having silanol terminals, 0.003 part of methyltrimethoxysilane, 0.0003 part of dibutyltin dilaurate and 99.9 parts of hexane was passed through the inside of the hollow-filament membrane at a linear speed of 1 m/min. for 30 seconds.

Then, nitrogen gas was passed through the membrane at a rate of 11 liter/min. for 1 minute to remove the excess solution. Thereafter, a 0.1% by weight hexadecene solution of 4,4'-diphenylmethane diisocyanate was passed through the inside of the hollow filament support for 3 minutes at a linear speed of 1 m/min.

Nitrogen was passed through the membrane at a flow rate of 1 liter/min. for 30 minutes to remove the excess solution. The membrane was heated at 80° C. for 30 minutes, and left to stand at room temperature for 1 day. Water was allowed to flow through the inside and outside of the hollow support for 24 hours to obtain a hollow filament-like separation membrane module.

This membrane has an oxygen permeation speed of $2.2 \times 10^{-4}$ cc/cm$^2$.sec.cmHg and an oxygen/nitrogen selectivity of 3.0.

EXAMPLE 39

A 1.0% by weight ethylene glycol solution of 3-(2-aminoethylaminopropyl)tris(trimethylsiloxane)silane was introduced into the inside of the hollow filament support obtained in Referential Example 1 and maintained at 1 kg/cm$^2$ for 1 minute. Then, the excess solution inside was removed by passing nitrogen gas. A 1.0% by weight hexadecene solution of 3,4'-diphenyl ether diisocyanate was introduced at a linear speed of 1 m/min., and reacted at 25° C. for 3 minutes. The hollow filament support was then washed in flowing water for 1 day, and fully air dried to obtain a hollow filament composite membrane. This membrane had an oxygen permeation speed of $0.92 \times 10^{-4}$ cc/cm$^2$.sec.mmHg and a selectivity of 3.5.

EXAMPLE 40

A 1.0% by weight propylene glycol solution of a compound of the following formula

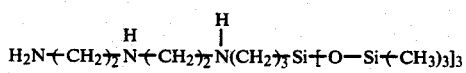

was forced into a hollow filament support in the same way as in Example 39. Then, a 1.0% by weight octadecene solution of diphenylmethane diisocyanate was introduced into the inside of the hollow filament at a linear speed of 1 m/min., and reacted at 25° C. for 3 minutes. The hollow filament suport was then washed in flowing water for 1 day, and fully air-dried to obtain a composite membrane. The composite membrane had an oxygen permeation speed of $0.71 \times 10^{-4}$ cc/cm$^2$.sec.mmHg and a selectivity of 4.3.

EXAMPLE 41

A polyisocyanate (C) was produced in the same way as in Example 25 by using a polyol of the following formula

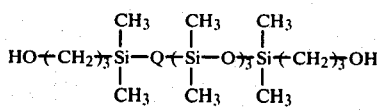

and 1,3-bis(isocyanatomethyl)cyclohexane.

A separation membrane was prepared in the same way as in Example 11 using the resulting polyisocyanate (C), a silicon-containing polyamine (A) of the following formula

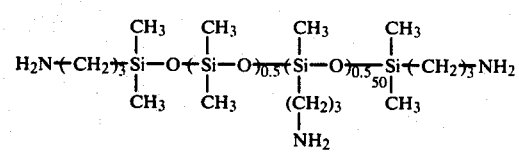

and a polysiloxane-type compound (B) (average molecular weight 26,000) of the following formula

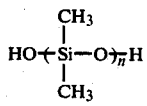

The separation membrane had an oxygen permeation speed of $2.7 \times 10^{-4}$ cc/cm$^2$.sec.mmHg and a selectivity of 3.2.

What is claimed is:

1. An ultrathin film composed substantially of a polyaddition polymer comprising bonded units derived from
    (A) at least one silicon-containing polyamine containing in the molecule at least two primary and/or secondary amino groups not directly bonded to the silicon atom,
    (B) at least one polysiloxane having at least two silanol-functional hydroxyl groups in the molecule, and
    (C) at least one polyisocyanate having at least two isocyanate groups in the molecule.

2. The ultrathin film of claim 1 wherein the silicon-containing polyamine (A) is represented by the following formula (I)

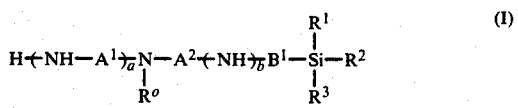

wherein
  R$^1$, R$^2$ and R$^3$, independently from each other, represent a hydrocarbon group or fluorinated hydrocarbon group having 1 to 16 carbon atoms, or a group of the following formula (I)-1

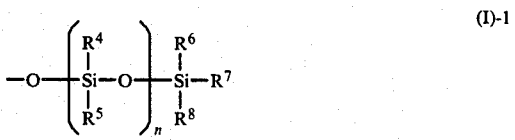

in which R$^4$, R$^5$, R$^6$, R$^7$ and R$^8$, independently from each other, represent a hydrocarbon or fluorinated hydrocarbon group having 1 to 16 carbon atoms, and n is zero or a number of at least 1,

A$^1$ and A$^2$, independently from each other, represent a divalent hydrocarbon group having 2 to 16 carbon atoms which may be interrupted by —O— or —SO$_2$—, B$^1$ represents a divalent hydrocarbon group having 2 to 16 carbon atoms, a is zero or 1, b is zero or 1, and R° represents a hydrogen atom, an alkyl group having 1 to 6 carbon atoms, or a group of the following formula (I)-2

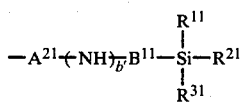
(I)-2 in which A$^{21}$ is a group selected from the definition of A$^2$, B$^{11}$ is a group selected from the definition of B$^1$, R$^{11}$, R$^{21}$ and R$^{31}$, independently from each other, are a group selected from the definition of R$^1$, and b' is a number selected from the definition of b, or R° may be bonded to the group A$^2$ to form a 5- to 7-membered ring together with the nitrogen atom to which they are bonded.

3. The ultrathin film of claim 2 wherein
R$^1$, R$^2$ and R$^3$ each represent methyl, ethyl, isopropyl, n-propyl, n-butyl, isobutyl, t-butyl, sec-butyl, n-pentyl, n-hexyl, n-octyl, n-nonyl, n-decyl, n-undecyl, n-dodecyl, n-tridecyl, n-tetradecyl, n-pentadecyl, n-hexadecyl, phenyl, tolyl, benzyl, perfluoromethyl, perfluoroethyl, 2-trifluoromethylethyl, trifluoromethylphenyl or the group of formula (I)-1 in which R$^4$, R$^5$, R$^6$ and R$^7$, independently from each other, are selected from the same groups as R$^1$ above, and n is as defined;

A$^1$ and A$^2$, independently from each other, represent alkylene having 2 to 12 carbon atoms, cyclohexylene, phenylene, xylylene, methylenephenylene, naphthylene or a group of the formula (I)-1-1

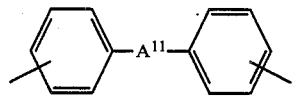
(I)-1-1 wherein
A$^{11}$ represents a single bond, —O—, —SO$_2$—, —CH$_2$— or

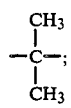

B$^1$ represents alkylene having 1 to 12 carbon atoms, cyclohexylene, phenylene, xylylene, methylenephenylene or naphthylene;
a is zero or 1;
b is zero or 1; and
R° represents hydrogen, methyl, ethyl, isopropyl, n-propyl, n-butyl, isobutyl, sec-butyl, t-butyl, n-pentyl, n-hexyl, or the group of formula (I)-2 in which R$^{11}$, R$^{21}$, R$^{31}$, A$^{21}$, B$^{11}$ and b' are as defined above, or R° is bonded to the group A$^2$ to form a 5- or 6-membered ring together with the nitrogen atom to which they are bonded.

4. The ultrathin film of claim 1 wherein the silicon-containing polyamine (A) contains in the molecule one or more bonded units represented by the following formula (II)

(II)

wherein R$^9$ represents a monovalent hydrocarbon or fluorinated hydrocarbon group having 1 to 16 carbon atoms, R$^{10}$ and R$^{12}$ are identical or different, and each represents a hydrogen atom, or a monovalent hydrocarbon group having 1 to 16 carbon atoms which may contain a primary or secondary amino group and a silicon atom, or R$^{10}$ and R$^{12}$ may be bonded to each other to form an alkylene group interrupted by the group —NH—, p is an integer of 1 to 10, provided that R$^{10}$ and R$^{12}$ are not simultaneously hydrocarbon groups having no amino group; and at least two primary and/or secondary amino groups in the molecule.

5. The ultrathin film of claim 4 wherein not all, but at least some, of the bonded units of formula (II) are bonded units of the following formula (II)-a

(II)-a wherein R$^9$, R$^{10}$, and R$^{12}$ are as defined in formula (II) above, provided that the free bond from the silicon atom is bonded directly to another carbon atom or another oxygen atom, and the free bond from the oxygen atom is bonded directly to another silicon atom.

6. The ultrathin film of claim 4 or 5 wherein the silicon-containing polyamine containing units represented by the following formula (III)

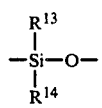
(III)

wherein R$^{13}$ and R$^{14}$ are identical or different and each represents a monovalent hydrocarbon, fluorinated hydrocarbon or tri-hydrocarbon silyl hydrocarbon group having 1 to 16 carbon atoms,
in addition to the units of formula (II) or (II)-a.

7. The ultrathin film of claim 4 or 5 wherein in formulae (II) and (II)-a, R$^9$ represents an alkyl group having 1 to 10 carbon atoms, a cycloalkyl group having 5 or 6 carbon atoms, a phenyl group, a tolyl group, or a fluorinated derivative of any of these.

8. The ultrathin film of claim 4 or 5 wherein in formulae (II) and (II)-a, at least one of R$^{10}$ and R$^{12}$ is a hydrogen atom.

9. The ultrathin film of claim 4 or 5 wherein in general formulae (II) and (II)-a, the monovalent hydrocarbon group $R^{10}$ or $R^{12}$ is an alkyl group having 1 to 12 carbon atoms, an alicyclic group having 6 to 15 carbon atoms, an aromatic group having 6 to 15 carbon atoms or an aralkyl group having 7 to 15 carbon atoms each of which may containing a primary or secondary amino group and may be substituted by a trialkyl silyl group having 1 to 10 carbon atoms in each alkyl moiety.

10. The ultrathin film of claim 5 wherein p in formulae (II) and (II)-a is 2 to 6.

11. The ultrathin film of claim 4 or 5 wherein the silicon-containing polyamine is represented by the following formula (IV)

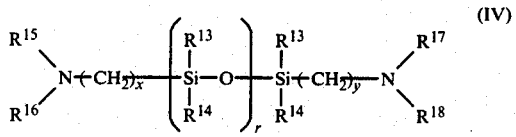

wherein $R^{13}$ and $R^{14}$ are identical or different and each represents a monovalent hydrocarbon, fluorinated hydrocarbon or tri-hydrocarbon silyl hydrocarbon group having 1 to 16 carbon atoms, a plurality of $R^{13}$ groups or a plurality of $R^{14}$ groups are identical or different, $R^{15}$, $R^{16}$, $R^{17}$ and $R^{18}$ are identical or different and are selected from the groups defined for $R^{10}$ and $R^{12}$, x and y are identical or different and each represents an integer of 1 to 10, and y represents zero or a number of 1 to 250.

12. The ultrathin film of claim 4 or 5 wherein the silicon-containing polyamine is represented by the following formula (V)

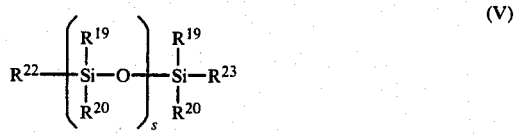

wherein
$R^{19}$ and $R^{20}$ groups are identical or different and each represents a monovalent hydrocarbon or fluorinated hydrocarbon group having 1 to 16 carbon atoms, or a group of the following formula (V)-1

in which $R^{24}$ and $R^{25}$ are identical or different and are selected from the groups defined for $R^{10}$ and $R^{12}$, and z is an integer of 1 to 10,
$R^{22}$ and $R^{23}$ are identical or different and each represents a hydroxyl group, a monovalent hydrocarbon group, a fluorinated hydrocarbon group or a monovalent hydrocarbon—O— group or a group of formula (V)-1 mentioned above and s is a number of 1 to 250, provided that a plurality of the groups of formula (V)-1 are not bonded to the same silicon atom simultaneously, and the compound of formula (V) contains at least 2 primary or secondary amino groups.

13. The ultrathin film of claim 1 wherein the silicon-containing polyamine (A) contains in the molecule at least one bond unit represented by the following formula (VI)

wherein $R^9$, $R^{10}$ and $R^{12}$ are the same as defined in formula (II) and Ar represents a divalent aromatic hydrocarbon group,
and at least two primary and/or secondary amino groups in the molecule.

14. The ultrathin film of claim 1 wherein the silicon-containing polyamine (A) is represented by the following formula (VII)

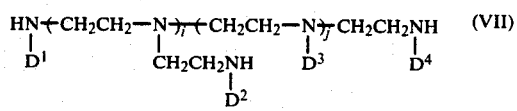

wherein
$D^1$, $D^2$, $D^3$ and $D^4$, independently from each other, represent a hydrogen atom or a group of the formula (VII)-1

in which $B^1$, $R^1$, $R^2$ and $R^3$ are as defined hereinabove,
i and j are identical or different and each represents zero or a positive number, provided that the sum of i and j is at least 2, and at least one group of formula (VII)-1 is contained in the molecule.

15. The ultrathin film of claim 1 wherein the polysiloxane compound (B) contains at least two bonded units of the formula

wherein $R^{26}$ represents a monovalent hydrocarbon or fluorinated hydrocarbon group having 1 to 18 carbon atoms,
in the molecule.

16. The ultrathin film of claim 15 wherein all of the bonded units of formula (VIII) form bonded units of the following formula (VIII)-a

wherein $R^{26}$ is as defined above.

17. The ultrathin film of claim 1 wherein the polysiloxane compound (B) is represented by the following formula (VIII)-b

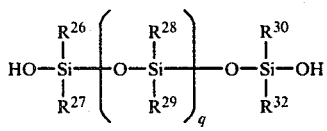
(VIII)-b wherein $R^{26}$, $R^{27}$, $R^{28}$, $R^{29}$, $R^{30}$ and $R^{32}$ are identical or different and each represents a monovalent hydrocarbon or fluorinated hydrocarbon group having 1 to 18 carbon atoms, and q is a positive number.

18. The ultrathin film of claim 17 wherein the monovalent hydrocarbon group is an alkyl group having 1 to 18 carbon atoms, phenyl, tolyl or benzyl, and the movovalent fluorinated hydrocarbon group is perfluoromethyl, perfluoroethyl, 2-trifluoromethylethyl or trifluorophenylmethyl.

19. The ultrathin film of claim 1 wherein the polyisocyanate (C) is a silicon-containing polyisocyanate containing at least two isocyanate groups in the molecule.

20. The ultrathin film of claim 1 wherein the polyisocyanate (C) is represented by the following formula (IX)

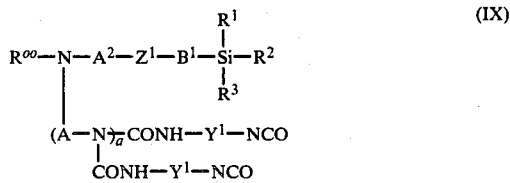
(IX)

wherein
$R^1$, $R^2$, $R^3$, $B^1$, $A^2$, $A^1$ and a are as defined hereinabove, $Y^1$ represents a hydrocarbon group having 3 to 15 carbon atoms, $R^{oo}$ represents a hydrogen atom, an alkyl group having 1 to 6 carbon atoms, a group of the following formula (IX)-1

$$-CONH-Y^1-NCO \qquad (IX)\text{-}1$$

in which $Y^1$ is as defined,
a group of the following formula (IX)-2

(IX)-2 in which $A^{21}$, $B^{11}$, $R^{11}$, $R^{21}$ and $R^{31}$ are the same as defined for formula (I)-2, and $Z^2$ represents a single bond or a group of the following formula (IX)-3

(IX)-3 wherein $Y^1$ is as defined above,
or $R^{oo}$ and $A^2$ may be bonded to each other to form a 5- to 7-membered ring together with the nitrogen atom to which they are bonded, and $Z^1$ is a group selected from the definition of $Z^2$.

21. The ultrathin film of claim 20 wherein in formula (IX), $R^1$, $R^2$, $R^3$, $B^1$, $A^2$, $A^1$ and a are the same as defined hereinabove, $Y^1$ represents an alkylene, cycloalkylene, arylene or alkylene-aryleene-alkylene group having 1 to 15 carbon atoms, and $R^{oo}$ and $Z^1$ are the same as defined hereinabove.

22. The ultrathin film of claim 1 wherein the polyisocyanate (C) is represented by the following formula (X)

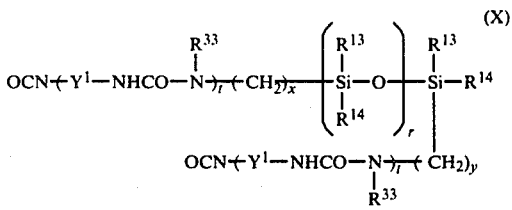
(X)

wherein $R^{13}$, $R^{14}$, $Y^1$, r, x and y are the same as defined above, $R^{33}$ represents a hydrogen atom or a monovalent hydrocarbon group having 1 to 16 carbon atoms, and t is zero or 1.

23. The ultrathin film of claim 1 wherein the polyisocyanate (C) is represented by the following formula (XI)

(XI)

wherein the definitions of $R^{20}$, $R^{22}$, $R^{23}$ and s are the same as in formula (V), and a plurality of $R^{34}$ groups are identical or different and each is a group selected from the definition of $R^{13}$ or a group of the following formula

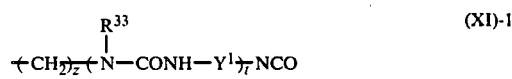
(XI)-1 wherein $R^{33}$, $Y^1$, t and z are as defined above,
provided that at least two groups of formula (XI)-1 are contained in the molecule.

24. The ultrathin film of claim 1 wherein the polyisocyanate (C) is represented by the following formula (XII)

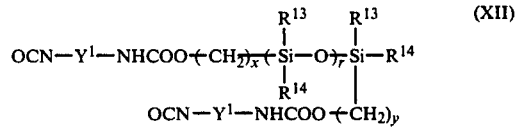
(XII)

wherein $R^{13}$, $R^{14}$, $Y^1$, x, y and r are the same as defined above.

25. The ultrathin film of claim 1 wherein the polyisocyanate (C) is an aliphatic diisocyanate having 3 to 17 carbon atoms, an alicyclic diisocyanate having 8 to 17 carbon atoms, an aralkyl diisocyanate having 9 to 17 carbon atoms, a monocyclic or dicyclic aromatic diisocyanate having 8 to 17 carbon atoms, a tricyclic or higher aromatic tri- to dodecaisocyanate having about 23 to about 100 carbon atoms.

26. An ultrathin film composed substantially of a polyaddition polymer comprising bonded units derived from said silicon-containing polyamine (A) of formula (I) in claim 2 above and said polyisocyanate (C).

27. The ultrathin film of claim 1 which has a thickness of about 0.01 to about 1 micron.

28. The ultrathin film of claim 1 which has a thickness of about 0.03 to about 0.5 micron.

* * * * *